(12) United States Patent
Lee et al.

(10) Patent No.: US 10,211,915 B2
(45) Date of Patent: Feb. 19, 2019

(54) FEEDBACK METHOD AND APPARATUS FOR TRANSMITTING AND RECEIVING MULTICARRIER SIGNAL IN WIRELESS MOBILE COMMUNICATION SYSTEM

(71) Applicant: Samsung Electronics Co., Ltd, Gyeonggi-do (KR)

(72) Inventors: Byunghwan Lee, Gyeonggi-do (KR); Yeohun Yun, Gyeonggi-do (KR); Kyeongyeon Kim, Gyeonggi-do (KR); Chanhong Kim, Gyeonggi-do (KR); Taeyoung Kim, Seoul (KR); Jiyun Seol, Gyeonggi-do (KR); Ming Hoka, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/508,910

(22) PCT Filed: Sep. 1, 2015

(86) PCT No.: PCT/KR2015/009185
§ 371 (c)(1),
(2) Date: Mar. 3, 2017

(87) PCT Pub. No.: WO2016/036106
PCT Pub. Date: Mar. 10, 2016

(65) Prior Publication Data
US 2017/0201317 A1    Jul. 13, 2017

(30) Foreign Application Priority Data

Sep. 4, 2014 (KR) .................. 10-2014-0117852

(51) Int. Cl.
*H04B 7/26* (2006.01)
*H04B 15/00* (2006.01)
*H04W 84/04* (2009.01)

(52) U.S. Cl.
CPC ............... *H04B 7/26* (2013.01); *H04B 15/00* (2013.01); *H04W 84/042* (2013.01)

(58) Field of Classification Search
CPC ........ H04B 7/26; H04B 15/00; H04W 84/042
(Continued)

(56) References Cited

U.S. PATENT DOCUMENTS 8,699,603 B1 * 4/2014 Baligh ................. H04B 7/0413
375/267
8,743,982 B2   6/2014 Bellanger
(Continued)

FOREIGN PATENT DOCUMENTS

CN    101783782 B       7/2012
KR    1020140098509 A   8/2014
WO    2013144715 A1    10/2013

OTHER PUBLICATIONS

Huawei, et al., "Considerations on Further Enhancements to Scalable UMTS", 3GPP TSG-RAN WG1 Meeting #76, R1-140699, Prague, Czech Republic, Feb. 10-14, 2014, 13 pages.
(Continued)

*Primary Examiner* — David Bilodeau

(57) ABSTRACT

This disclosure relates to a 5G or pre-5G communication system to be provided for supporting higher data transfer rate following a 4G communication system such as LTE. To accomplish the objective mentioned above, a method for transmitting and receiving a signal at a terminal in the mobile communication system according to one embodiment of the present application comprises the steps of: receiving, from a base station, a reference signal generated on the basis of a first filter; determining channel information
(Continued)

on the basis of the received reference signal; transmitting the determined channel information to the base station; receiving, from the base station, information related to a second filter determined on the basis of the channel information; and receiving, from the base station, a data signal on the basis of the second filter. According to an embodiment of the present application, it is possible to maximize the signal-to-interference-plus-noise ratio (SINR) while minimizing spectral interference in the event of multiuser connection, by using a prototype filter application method and system structure.

19 Claims, 25 Drawing Sheets

(58) Field of Classification Search
USPC .......................................................... 455/512
See application file for complete search history.

(56) References Cited

U.S. PATENT DOCUMENTS

| 2005/0265436 | A1* | 12/2005 | Suh | ....................... | H04L 1/0026 |
| | | | | | 375/221 |
| 2006/0256843 | A1* | 11/2006 | Grant | .................... | H04B 1/7103 |
| | | | | | 375/148 |
| 2011/0211547 | A1* | 9/2011 | Kim | ....................... | H04B 7/024 |
| | | | | | 370/329 |
| 2012/0033608 | A1* | 2/2012 | Seo | ....................... | H04B 7/2606 |
| | | | | | 370/315 |
| 2014/0355659 | A1* | 12/2014 | Kuo | .................... | H04L 25/0202 |
| | | | | | 375/230 |
| 2015/0049836 | A1 | 2/2015 | Li et al. | | |
| 2015/0365153 | A1 | 12/2015 | Kim et al. | | |

OTHER PUBLICATIONS

Taehyun Lee, et al., "QAM-FBMC System with a Robust Prototype Filter in Multipath Fading Channels", The 18th IEEE International Symposium ISCE 2014, Jun. 22-25, 2014, 3 pages.
International Search Report dated Dec. 9, 2015 in connection with International Application No. PCT/KR2015/009185, 5 pages.
Written Opinion of the international Searching Authority dated Dec. 9, 2015 in connection with International Application No. PCT/KR2015/009185, 5 pages.

* cited by examiner

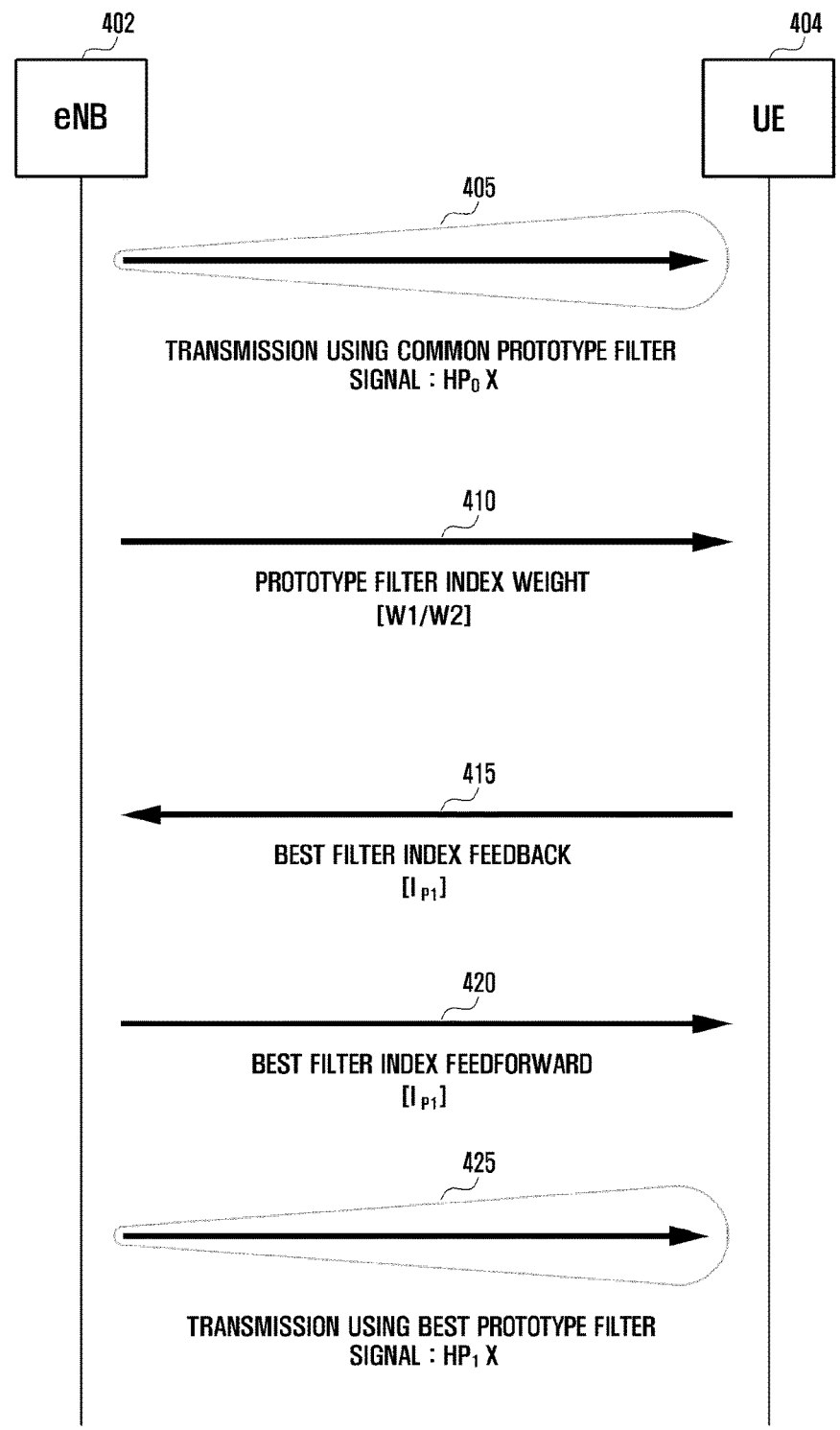

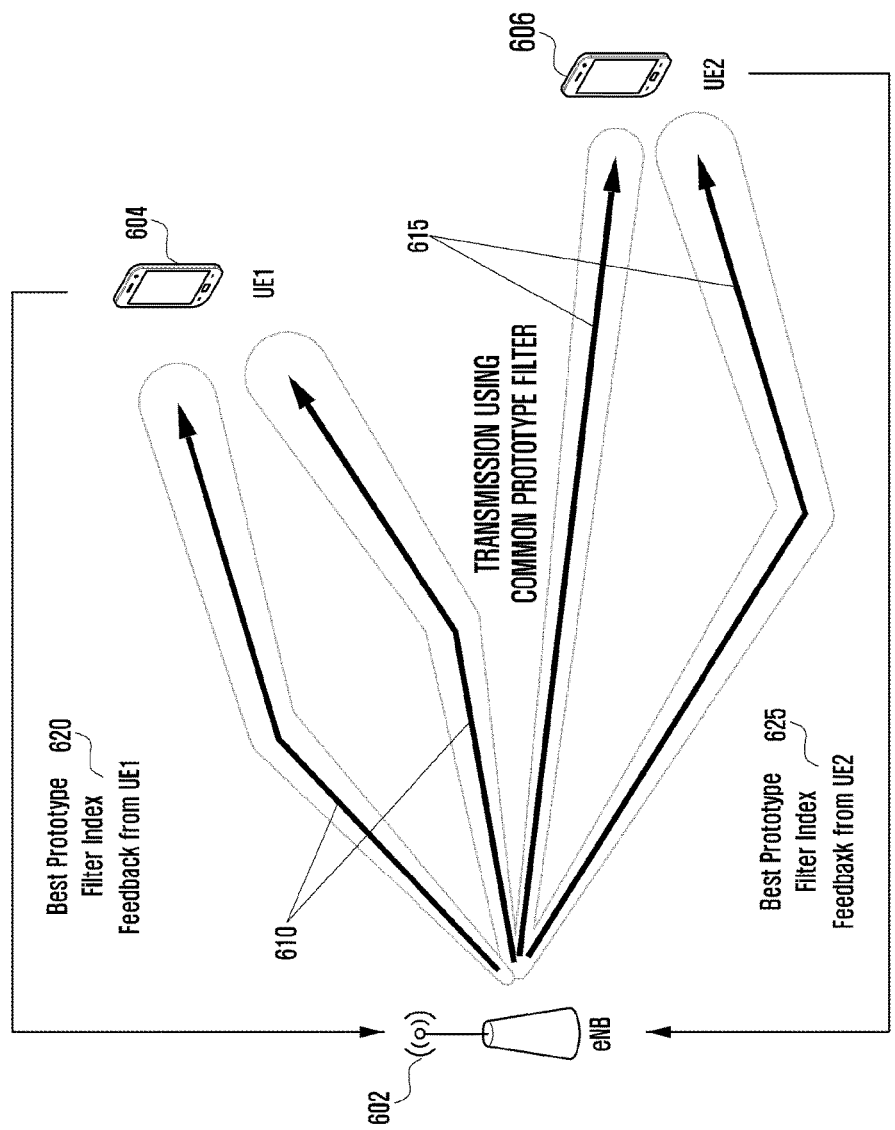

FEEDBACK METHOD AND APPARATUS FOR TRANSMITTING AND RECEIVING MULTICARRIER SIGNAL IN WIRELESS MOBILE COMMUNICATION SYSTEM

CROSS-REFERENCE TO RELATED APPLICATION(S)

The present application claims priority under 35 U.S.C. § 365 to International Patent Application No. PCT/KR2015/009185 filed Sep. 1, 2015, entitled "FEEDBACK METHOD AND APPARATUS FOR TRANSMITTING AND RECEIVING MULTICARRIER SIGNAL IN WIRELESS MOBILE COMMUNICATION SYSTEM", and, through International Patent Application No. PCT/KR2015/009185, to Korean Patent Application No. 10-2014-0117852 filed Sep. 4, 2014, each of which are incorporated herein by reference into the present disclosure as if fully set forth herein.

TECHNICAL FIELD

The present invention relates to a feedback method and apparatus for multicarrier signal communication in a wireless mobile communication system. In detail, the present invention relates to a method and apparatus for improving communication performance using prototype filters in consideration of the channel condition and multiuser environment in filter bank-based multicarrier signal communication.

BACKGROUND ART

Mobile communication systems were developed to provide subscribers with voice communication services on the move. Recently, mobile communication systems have evolved beyond the early voice-oriented services to the level of supporting high speed data communication services. However, resource shortages and user requirements for higher speed services have spurred evolution towards increasingly more advanced mobile communication systems.

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive MIMO, Full Dimensional MIMO (FD-MIMO), array antenna, analog beamforming, and large scale antenna.

Also, for throughput enhancement of the 5G communication system, research is being conducted on various techniques such as small cell, advanced small cell, cloud radio access network (cloud RAN), ultra-dense network, Device to Device (D2D) Communication, wireless backhaul, moving network, cooperative communication, Coordinated Multi-Points (CoMP), and interference cancellation.

Furthermore, the ongoing research includes the use of Hybrid FSK and QAM Modulation (FQAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

The mobile communication system has evolved to a high-speed, high-quality wireless packet data communication system capable of providing data and multimedia services beyond the early voice-oriented services. The standardization organizations such as the $3^{rd}$ Generation Partnership Project (3GPP), the $3^{rd}$ Generation Partnership Project-2 (3GPP2), and the Institute of Electrical and Electronics Engineers (IEEE) have standardized $3^{rd}$ Generation mobile communication systems based on multicarrier multiple-access schemes. Recently, various multicarrier-based mobile communication standards such as 3GPP Long Term Evolution (LTE), 3GPP2 Ultra Mobile Broadband (UMB), and IEEE 802.16m have been developed to meet the requirements of the high-speed, high-quality wireless packet data communication services.

The existing 3G wireless packet data communication systems LTE, UMB, and 802.16m operate based on multicarrier multiple access schemes and adopt various techniques such as Multiple-Input Multiple-Output (MIMO), beamforming, Adaptive Modulation and Coding (AMC), and Channel-Sensitive Scheduling to improve the transmission efficiency. The above techniques are capable of improving transmission efficiency and system throughput in such a way that data rates are adjusted by concentrating transmission power to certain antennas according to the channel quality and transmitting data selectively to the user with a high channel quality. Since most of these techniques operate based on the CSI between a base station (BS) (hereinafter, interchangeably referred to as an evolved Node B (eNB)) and a terminal (hereinafter, interchangeably referred to as a User Equipment (UE) or Mobile Station (MS)), it is necessary for the base station or the terminal to measure the channel state therebetween using a reference signal such as a Channel State Indication Reference Signal (CSI-RS). The eNB denotes a device located at a certain place for downlink transmission and uplink reception, and one eNB may take charge of a plurality of cells. A mobile communication system is comprised of a plurality of eNBs distributed geometrically, and each eNB can accommodate a plurality of cells for communicating signals.

Meanwhile, in recent years research has been conducted on transmission/reception schemes more efficient than Orthogonal Frequency Division Multiplexing (OFDM). As a consequence, the research focus has moved from studying the orthogonal waveform design represented by OFDM to studying a bi-orthogonal waveform design characterized by reduced orthogonality and narrow spectrum, such as Bi-orthogonal Frequency-Division Multiplexing (BFDM), and a non-orthogonal waveform design, such as Universal Filtered Multi-Carrier (UFMC); however, for use of a non-orthogonal waveform with reduced orthogonality, there is a need of a feedback method capable of improving communication efficiency.

DISCLOSURE OF INVENTION

Technical Problem

The present invention has been made in an effort to solve the above problems and aims to provide a feedback apparatus and method that is capable of protecting against performance degradation caused by a change of channel condition, minimizing channel information exchanged between a base station and a terminal, guaranteeing a given performance in a possible channel environment between the base station and the terminal in consideration of the tradeoff between orthogonality and spectrum bandwidth, and solving spectrum interference problems in a multiuser access environment.

Solution to Problem

In accordance with an aspect of the present invention, a signal transmission/reception method of a terminal in a mobile communication system includes receiving a reference signal generated based on a first filter from a base station, determining channel information based on the reference signal, transmitting the channel information to the base station, receiving information on a second filter determined based on the channel information from the base station, and receiving a data signal based on the second filter from the base station.

In accordance with another aspect of the present invention, a signal transmission/reception method of a base station in a mobile communication system includes transmitting a reference signal generated based on a first filter to a terminal, receiving channel information determined based on the reference signal from the terminal, transmitting information on a second filter determined based on the channel information, and transmitting a data signal to the terminal based on the second filter, wherein the channel information comprises information on a filter set which the base station transmits to the terminal and information on a filter selected from the filter set based on the reference signal.

In accordance with another aspect of the present invention, a terminal for transmitting/receiving signals in a mobile communication system includes a transceiver for transmitting and receiving signals and a controller which controls the transceiver to receive a reference signal generated based on a first filter from a base station, determines channel information based on the reference signal, controls the transceiver to transmit the channel information to the base station and receive information on a second filter determined based on the channel information and a data signal based on the second filter from the base station.

In accordance with still another aspect of the present invention, a base station for transmitting/receiving signals in a mobile communication system includes a transceiver for transmitting and receiving signals and a controller which controls the transceiver to transmit a reference signal generated based on a first filter to a terminal, receive channel information determined based on the reference signal from the terminal, transmit information on a second filter determined based on the channel information, and transmit a data signal to the terminal based on the second filter.

Advantageous Effects of Invention

The present invention is advantageous in terms of minimizing spectrum interference and maximizing Signal-to-Interference-Plus-Noise-Ratio (SINR) in a multiuser access environment using an enhanced prototype filter application scheme and system configuration. Also, the present invention is advantageous in terms of minimizing overload caused by prototype filter information exchange between a base station and a terminal using prototype filter indices.

BRIEF DESCRIPTION OF DRAWINGS

FIGS. 4A, 4B, and 4C are diagrams illustrating a method for determining a prototype filter for use on a downlink Single-Input Single-Output (SISO) channel according to an embodiment of the present invention;

FIGS. 6A and 6B are diagrams illustrating a method for determining a downlink prototype filter at multiple UEs according to an embodiment of the present invention;

MODE FOR THE INVENTION

Figure 1:
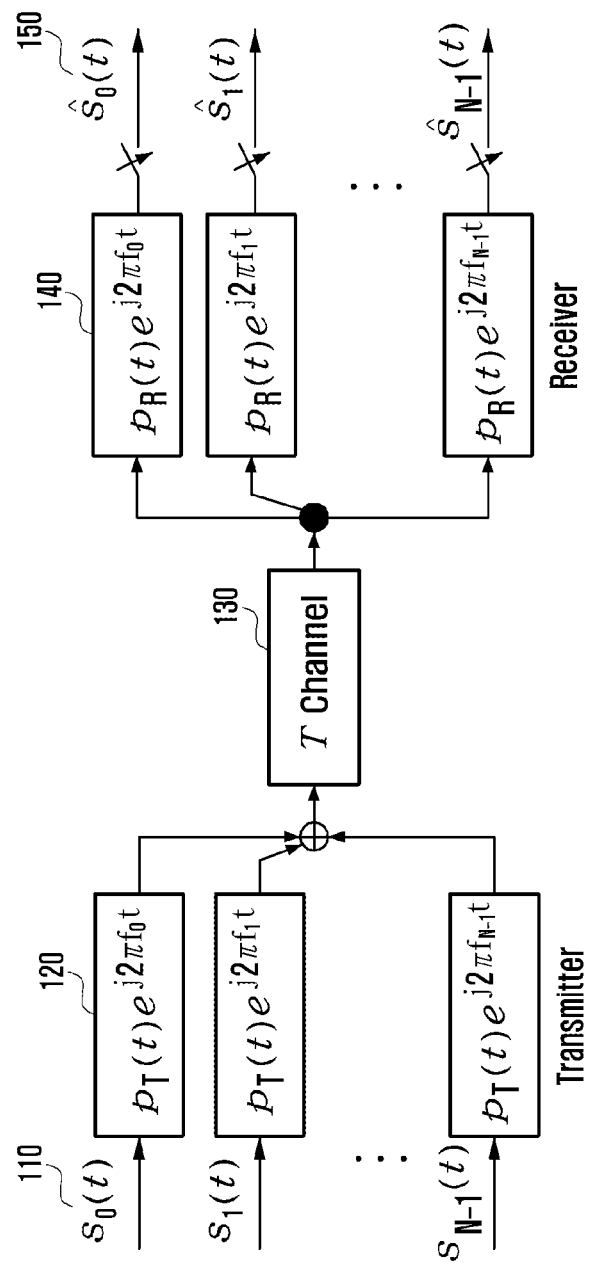
FIG. 1 is a diagram illustrating an FBMC-based signal transmission/reception method according to an embodiment of the present invention.

Exemplary embodiments of the present invention are described with reference to the accompanying drawings in detail.

Detailed descriptions of well-known functions and structures incorporated herein may be omitted to avoid obscuring the subject matter of the present invention. This aims to omit unnecessary description so as to make the subject matter of the present invention clear.

For the same reason, some elements are exaggerated, omitted, or simplified in the drawings. Also, in practice the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings; however, the present invention may be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module," according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

An embodiment of the present invention discloses an FBMC-based signal communication method and apparatus.

An FBMC scheme is capable of transmitting an input stream in the form of a plurality of symbols and controlling at least one of a transmission signal spectrum and an inter-symbol interference by applying filters to the input stream. The applied filters are in a filter bank, and the term filter bank may be used in a concept indicating filters applied to the signal depending on an embodiment.

The non-orthogonal waveform schemes for filter bank-based multicarrier transmission may use a single filter in the filter bank regardless of the channel condition and communication condition; however, it the case of using a single filter it may become difficult to control inter-symbol or inter-carrier interference efficiently. In more detail, using a single filter makes it difficult to control inter-subcarrier interference efficiently in the multicarrier environment.

In more detail, the single prototype filter utilization technology may cause performance degradation depending on the channel condition and, even when such a problem is overcome, require minimization of the channel information amount exchanged between the base station and a terminal. It may also be necessary to reflect the tradeoff between orthogonality and spectrum bandwidth of the reduced-or-thogonality prototype filter. The present invention provides a method and apparatus for applying a prototype filter that is capable of guaranteeing performance in various possible environments between a base station and a terminal and solving the spectrum interference problem in a multiuser access situation.

An embodiment of the present invention proposes a method for determining a prototype filter optimized between a base station and a terminal and exchanging related information therebetween in a filter bank-based multi-carrier system. In detail, an embodiment includes technical characteristics of the method and apparatus for exchanging uplink/downlink control signals carrying prototype filter information and channel information for use between a base station and a terminal.

In an embodiment, a prototype filter may include at least one of a common prototype filter and a dedicated prototype filter. In an embodiment, the dedicated prototype filter may be selected by the base station and the terminal from a prototype filter set including at least one prototype filter. In detail, the base station and the terminal may exchange channel status information and select at least one dedicated prototype filter from the prototype filter set according to the channel condition. The dedicated prototype filter may be selected based on at least one of channel transmission amount, inter-symbol interference, and inter-carrier interference. The inter-carrier interference may include inter-subcarrier interference.

The common prototype filter may be a universal filter for use in selecting, reporting, or notifying a filter before selecting a dedicated prototype filter. In detail, a reference signal for channel measurement or a signal carrying prototype filter set information may be transmitted by means of a common prototype filter. In more detail, the common prototype filter may be used for transmitting/receiving at least one of a synchronization signal, a channel estimation reference signal, a filter information feedback signal, and a filter information feedforward signal.

The dedicated prototype filter may be applied in other cases. The common prototype filter may be used for transmitting at least one of the synchronization signal, the channel estimation reference signal, and control channel signals, while the dedicated prototype filter may be used for data channel transmission.

If a dedicated prototype filter is selected between the terminal and the base station, it may be possible to communicate signals using the dedicated prototype filter regardless of the type of signal and to change the dedicate prototype filter in consideration of the channel condition.

The prototype filter set for use between the base station and the terminal may be managed in two approaches. The first approach is to predefine the prototype filter set between the base station and the terminal. In this approach, it may be possible to exchange therebetween an index of the prototype filter selected by the base station or the terminal.

The second approach is for the terminal that has information on the common prototype filter but no information on the prototype filter set receives the prototype filter set information from the serving eNB. In this approach, the base station may transmit the prototype filter set information to the terminal.

FIG. 1 is a diagram illustrating an FBMC-based signal transmission/reception method according to an embodiment of the present invention.

In reference to FIG. 1, a transmitter 120 may transmit a signal generated from an input signal 110 to a receiver 140 through a transmission channel 130. In detail, the transmitter 120 may apply filters to a plurality of input signal streams, and the receiver 140 may apply the corresponding filters to acquire output signals 150.

The filters used in the transmitter 120 may be selected based on at least one of channel condition and inter-symbol interference. The filters used in the transmitter 120 may also be selected in a way of maximizing overall transmission throughput of the transmitter 120 and may be selected to maximize possible transmission throughput to all receivers when the transmitter 120 transmits signals to a plurality of receivers.

In an embodiment, $p_T(t)$ and $p_R(t)$ may be selected so that each corresponds respectively to predetermined filter sets. In more detail, they may be selected in a way of adjusting inter-symbol interference or inter-subcarrier interference.

In an embodiment, the length of a cyclic prefix (CP) of a transmission signal may be 0. In detail, symbols may be overlapped on the time axis. Also, the $p_T(t)$ to which a filter is applied may be greater than the symbol length T.

The transmitter 120 may apply filters to respective input signals, and the receiver may apply corresponding filters to recover the signals as expressed by the following equations.

$$x(t) = \sum_n \sum_{k \in \lambda} s_k[n] p_T(t - nT) e^{j2\pi(t-nT)f_k},$$

$$p_{T,k}(t) = p_T(t) e^{j2\pi t f_k}$$

$$x(t) = \sum_n \sum_{k \in \lambda} s_k[n] p_{T,k}(t - nT)$$

$$\langle p_{T,k}(t - mT), p_{R,l}(t - nT) \rangle = \delta_{kl} \delta_{mn},$$

Figure 2:
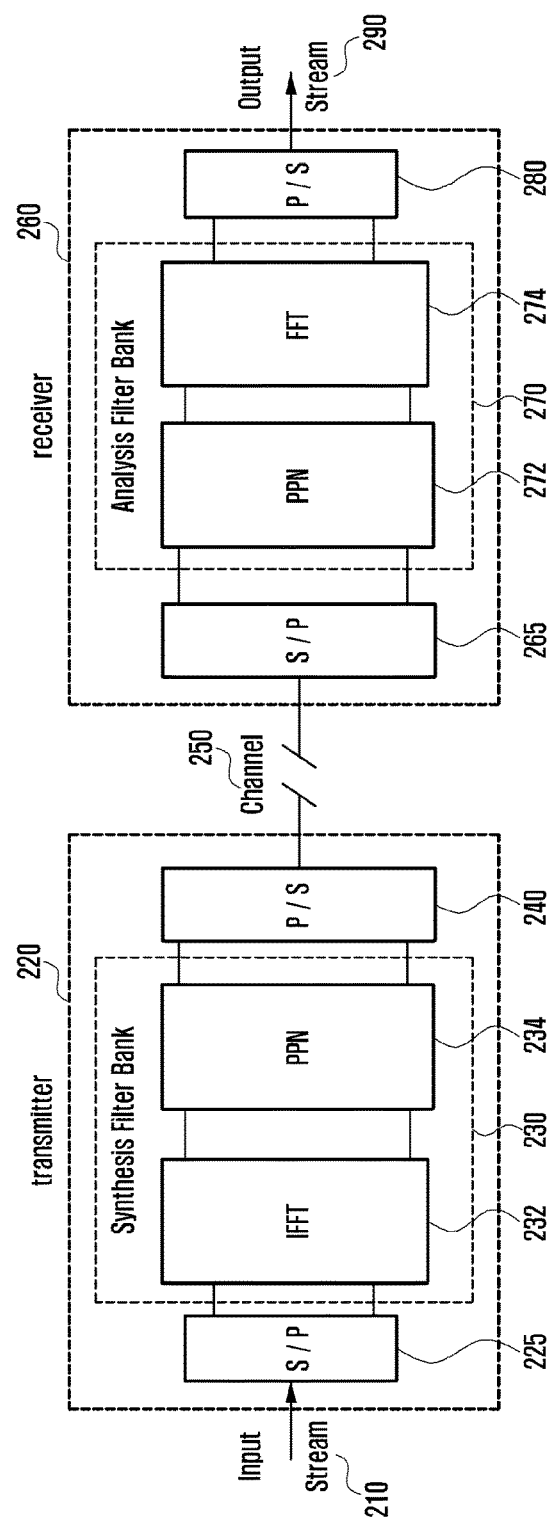
FIG. 2 is a diagram illustrating an FBMC transmitter and an FBMC receiver according to an embodiment of the present invention.

In the above equations, T denotes the symbol length,

FIG. 2 is a diagram illustrating an FBMC transmitter and an FBMC receiver according to an embodiment of the present invention.

In reference to FIG. 2, the transmitter 220 may transmit a signal, and the receiver 260 may receive the signal. In detail, the transmitter 220 may transmit an input stream 210 to the receiver 260 through a channel 250. The receiver 260 may process the received signal to generate an output stream 290.

In an embodiment, the transmitter 220 may include at least one of a Serial-to-Parallel converter 225, a synthesis filter bank 230, and a Parallel-to-Serial converter 240.

The synthesis filter bank 230 may include an Inverse Fast Fourier Transformer 232 and a poly phase network (PPN) 234. In an embodiment, the filter bank corresponding to the subcarriers is obtained by shifting the subcarrier frequency of a prototype filter. In this way, the PPN 234 may implement the filter bank effectively. In an embodiment, the PPN 234 may include the synthesis filter bank 230 optionally.

In an embodiment, at least two transmission symbols may be overlapped on the time axis. In an embodiment, the channel 250 may be a normal radio channel.

In an embodiment, the receiver 260 may include a Parallel-to-Serial converter 265, an analysis filter bank 270, and a Serial-to-Parallel converter 280.

The analysis filter bank 270 may include a PPN 272 and a Fast Fourier Transformer 274. In an embodiment, the PPN 272 of the receiver 260 may operate corresponding to the PPN 234 of the transmitter 220.

The transmitter 220 and the receiver 260 are configured as described above to communicate FBMC signals generated by applying filters to the respective subcarriers.

Figure 3A:
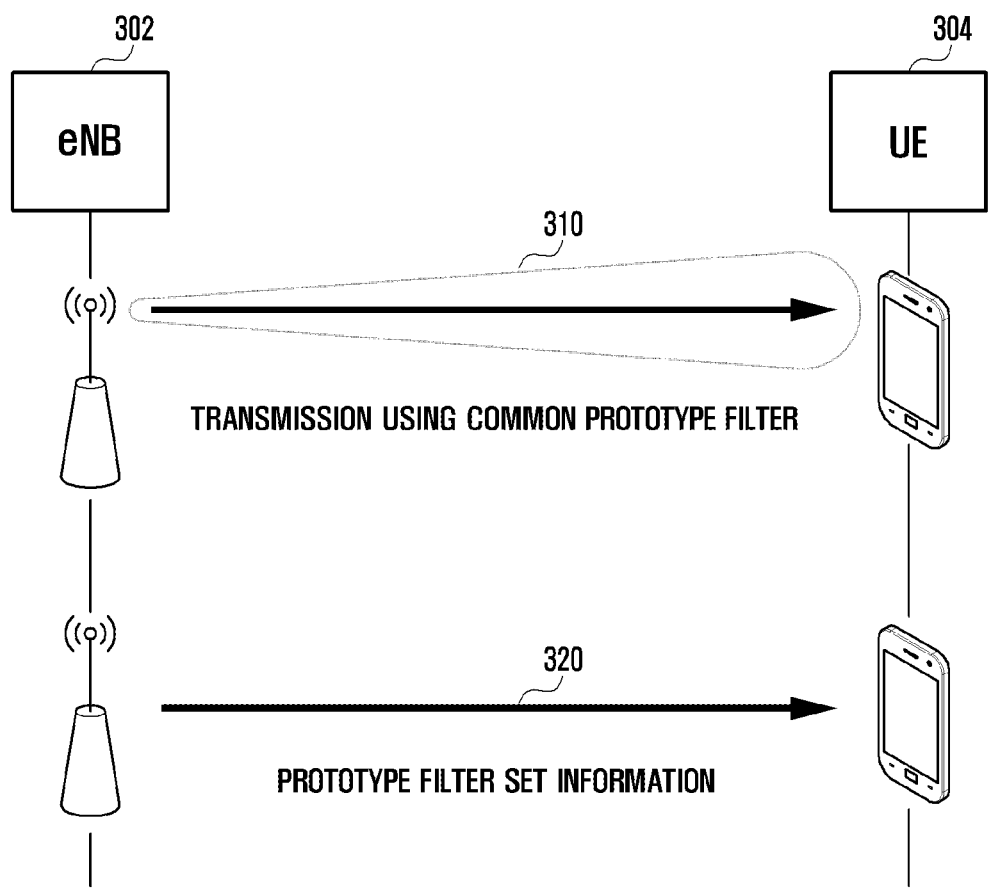
FIGS. 3A and 3B are diagrams illustrating exchange of prototype filter set information according to an embodiment of the present invention.
Figure 3B:
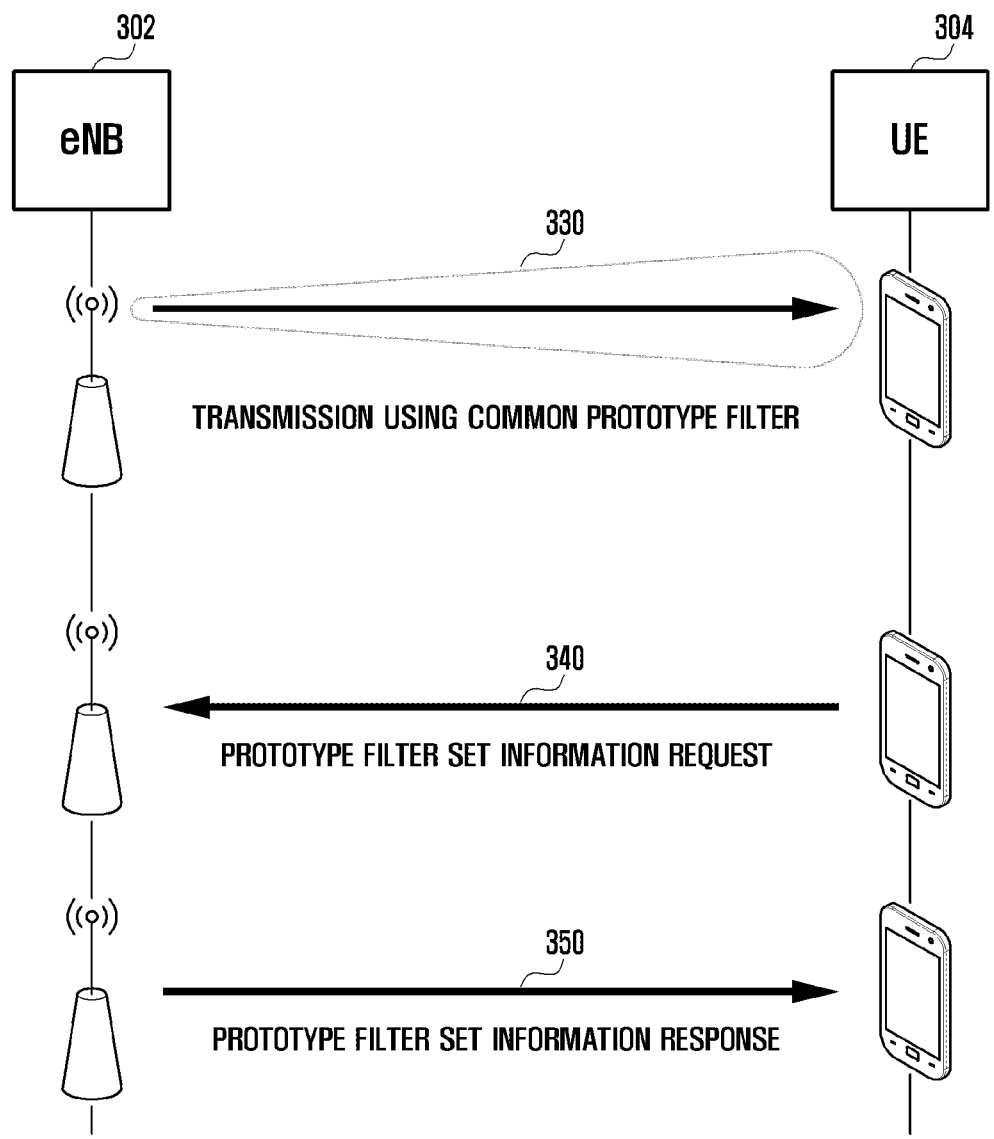

FIGS. 3A and 3B are diagrams illustrating exchange of prototype filter set information according to an embodiment of the present invention.

In reference to FIGS. 3A and 3B, an evolved Node B (eNB) 302 may communicate signals with a User Equipment (UE) 304.

FIG. 3A shows a prototype filter set management scheme in which the UE 304 receives the prototype filter set information from the eNB 302. In an embodiment, the UE 304 has common prototype filter information for use in receiving signals from the eNB 302. In detail, the signals transmitted by the eNB 302 may include at least one of a reference signal and a control signal.

The UE 304 may connect to the eNB 302 to receive signals from the eNB 302 using a common prototype filter at step 310. In the embodiment of FIG. 3A, the UE 304 may not have prototype filter set information.

The UE 304 may receive prototype filter set information from the eNB 302 at step 320. The eNB 302 may broadcast or multicast the prototype filter set information for the UE 304.

In FIG. 3B, the eNB 302 may transmit a signal to the UE 304 using the common prototype filter at step 330.

The UE 304 may transmit at step 340 a prototype filter set information request message to the eNB 302 based on the received signal. In an embodiment, the request message may include a request indicator and at least one of UE status and channel condition.

The eNB 302 may transmit at step 350 a prototype filter set information response message to the UE 304 in response to the request message. The response message may include the prototype filter set information which is determined based on the information contained in the request message received at step 340.

Figure 4B:
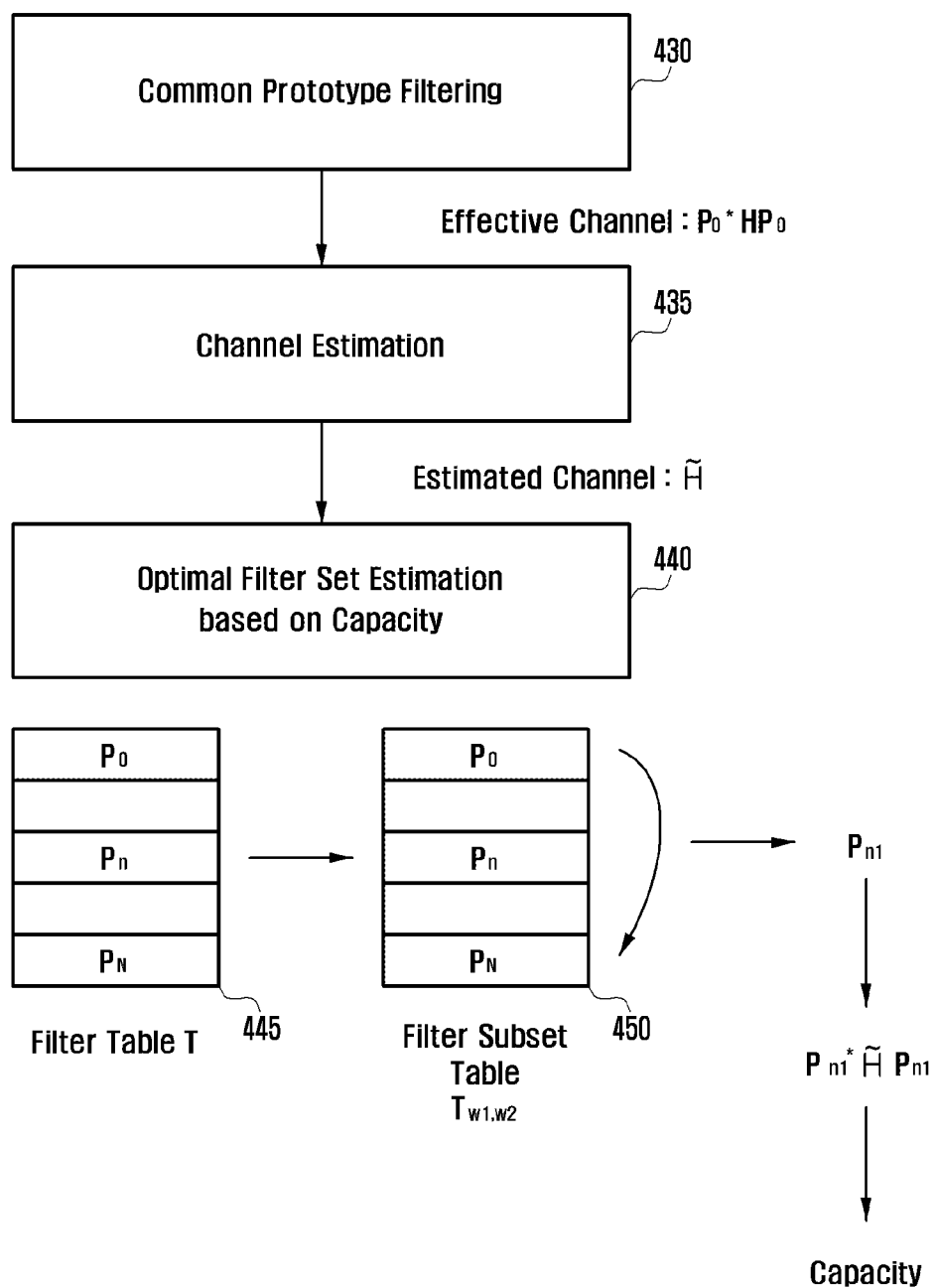
Figure 4C:
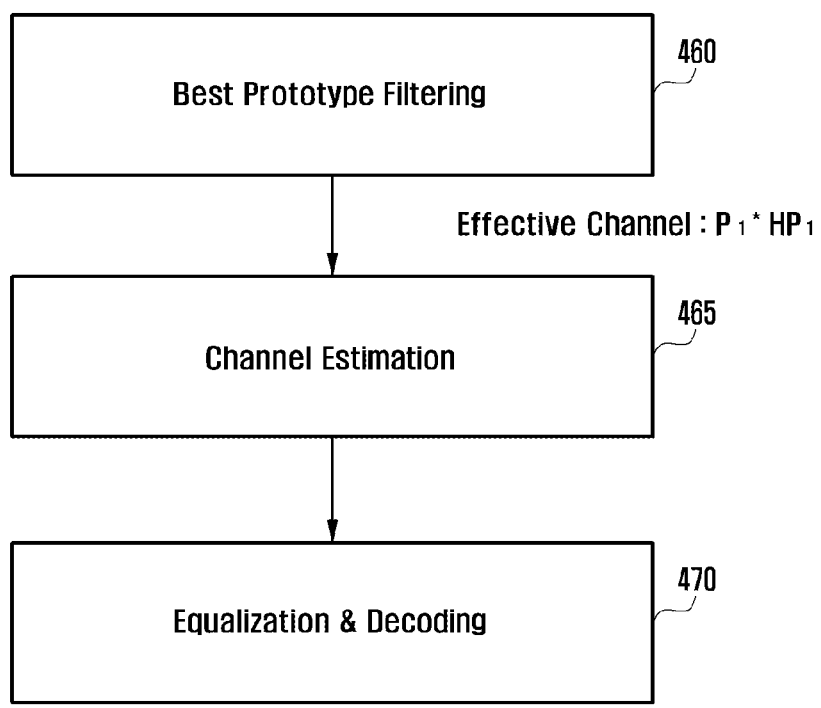

FIGS. 4A, 4B, and 4C are diagrams illustrating a method for determining a prototype filter for use on a downlink Single-Input Single-Output (SISO) channel according to an embodiment of the present invention.

In reference to FIG. 4A, an eNB 402 may communicate signals with a UE 404.

The eNB 402 may transmit a reference signal (pilot signal) for use by the UE 404 in channel estimation using a common prototype filter at step 405. In an embodiment, the common prototype filter may be preconfigured to the UE 404 and the eNB 402.

The eNB 402 may transmit at step 410 weight information for use in selecting a prototype filter based on the channel estimation result. The weight information transmission is optional. The weight information may be determined based on at least one of channel condition and scheduling status determined by the eNB 402 such that the UE 404 can select as a priority at least one of inter-symbol interference and inter-carrier interference.

If the weight information is received, the UE 404 may estimate the channel for communicating signals with the eNB 402 using the common prototype filter. At this time, the UE 404 may basically determine a dedicated prototype filter that maximizes its Signal-to-Interference-plus-Noise-Ratio (SINR). The UE 404 may also select the dedicated prototype filter based on the information received at step 410. In detail, the UE 404 may select the dedicated prototype filter using the prototype filter weight information that is transmitted by the eNB 402 for spectrum interference control in a multiuser access environment. In more detail, the eNB 402 may select a dedicated prototype filter maximizing its SINR within a range of the prototype filter set restricted or biased based on the weight information. The dedicated prototype filter maximizing SINR is selected as shown in FIG. 4B.

In reference to FIG. 4B, the UE 404 may at step 430 perform filtering on the signal transmitted at step 405 by the eNB 402 using the common prototype filter.

The UE 404 may perform channel estimation at step 435 based on the filtered information.

At step 440, the UE 404 may select a filter set capable of maximizing its capacity from a table 450 which is restricted based on the information received at step 410 in a filter table 445 including the prototype filter set preconfigured or received from the eNB 402.

The UE 404 may transmit the selected filter set information to the eNB 402 at step 415. In detail, the UE 404 may transmit to the eNB 402 the information on the dedicated prototype filter as feedback information through an uplink control channel. At this time, the UE 404 may transmit an index indicating the dedicated prototype filter to the eNB 402 to minimize waste of control channel.

At step 420, the eNB 402 may determine the final dedicated prototype filter for use in transmitting a signal to the UE 404 based on the information received at step 415. In detail, the eNB 402 may determine the final dedicated prototype filter based on at least one of channel condition and scheduling status. The eNB 402 may transmit to the UE 404 the information on the dedicated prototype filter determined finally. The eNB 402 may transmit to the UE 404 an index indicating the dedicated prototype filter determined finally.

At step 425, the eNB 402 may transmit a signal to the UE 404 by means of the dedicated prototype filter selected finally at step 420. The signal may include a signal transmitted on a data channel. The UE 404 may also receive a signal based on the information received at step 420 in a way as shown in FIG. 4C.

At step 460, the UE 404 may perform filtering on the signal received at step 425 with the prototype filter determined based on the information received at step 420.

The UE 404 may perform channel estimation based on the filtered information at step 465. In an embodiment, the channel estimation step may be selectively applied.

The UE 404 may acquire the information transmitted by the eNB 402 by performing at least one of equalization and decoding on the filtered information at step 470.

The eNB and the UE may communicate signals repeating the above-described steps and use the same filter in at least one transmission after the dedicated prototype filter is determined finally. The overall operation of FIG. 4A may be performed for every signal transmission.

Figure 5A:
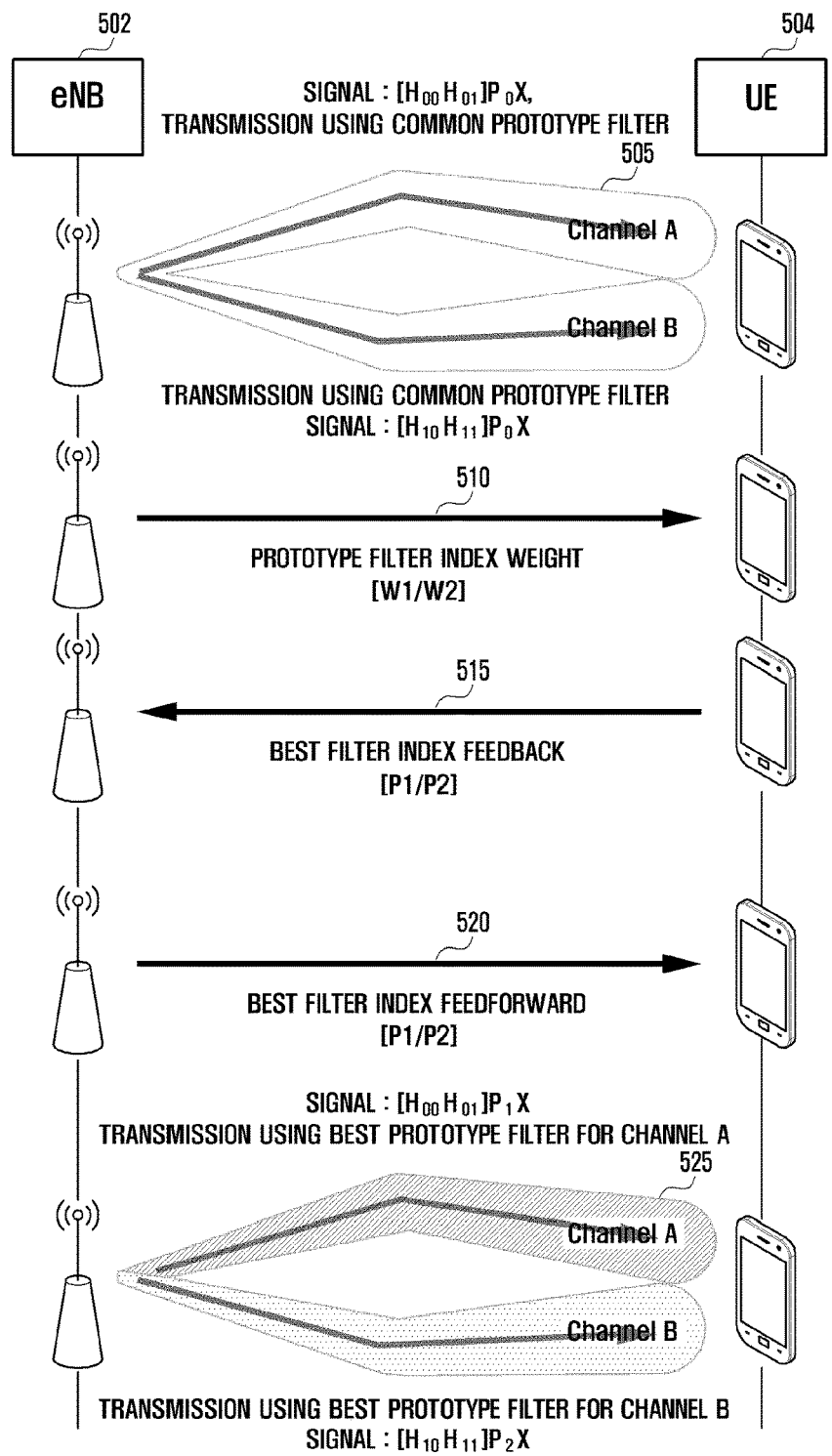
FIGS. 5A, 5B, and 5C are diagrams illustrating a method for determining a prototype filter for a downlink Multiple-Input Multiple-Output (MIMO) channel according to an embodiment of the present invention.
Figure 5B:
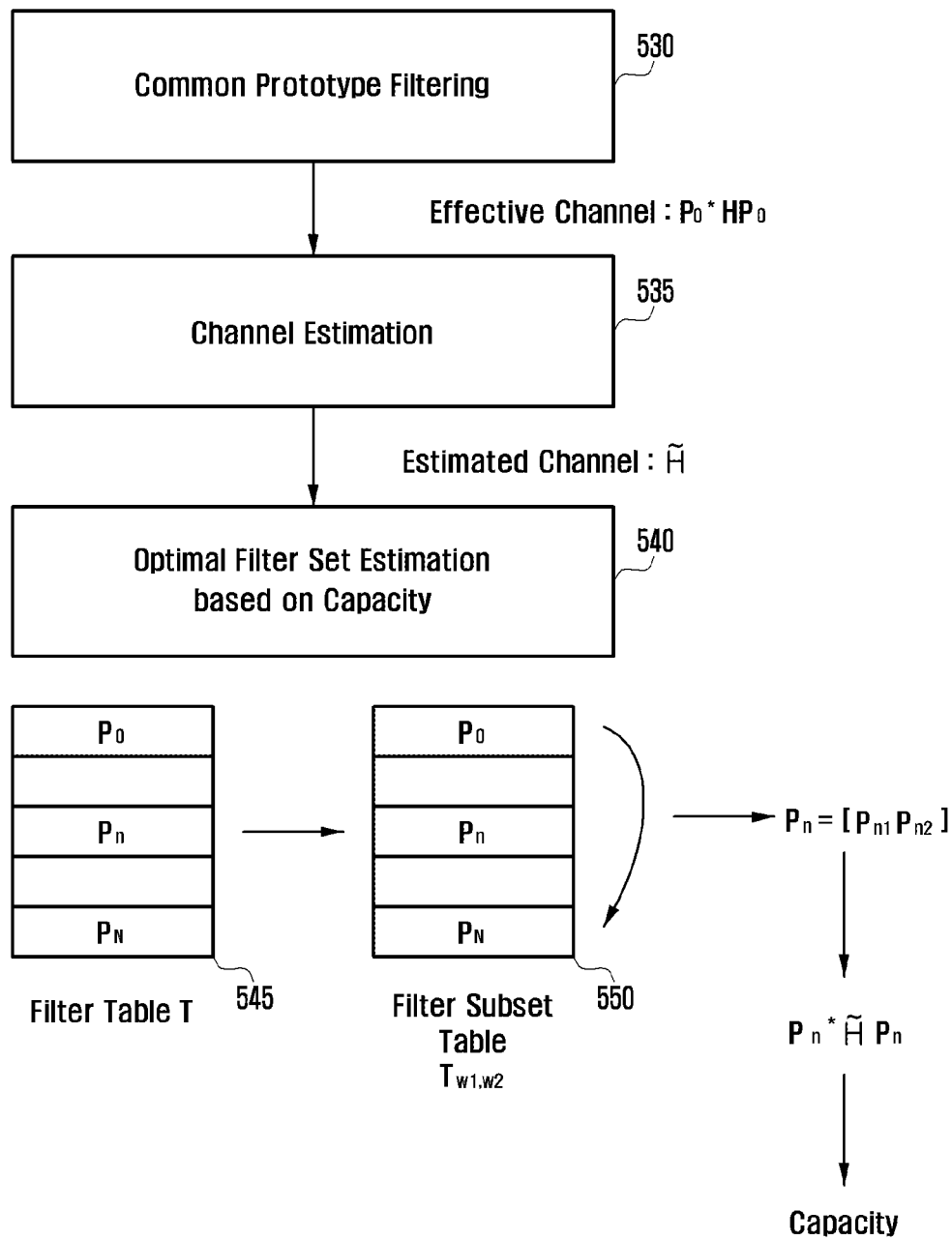
Figure 5C:
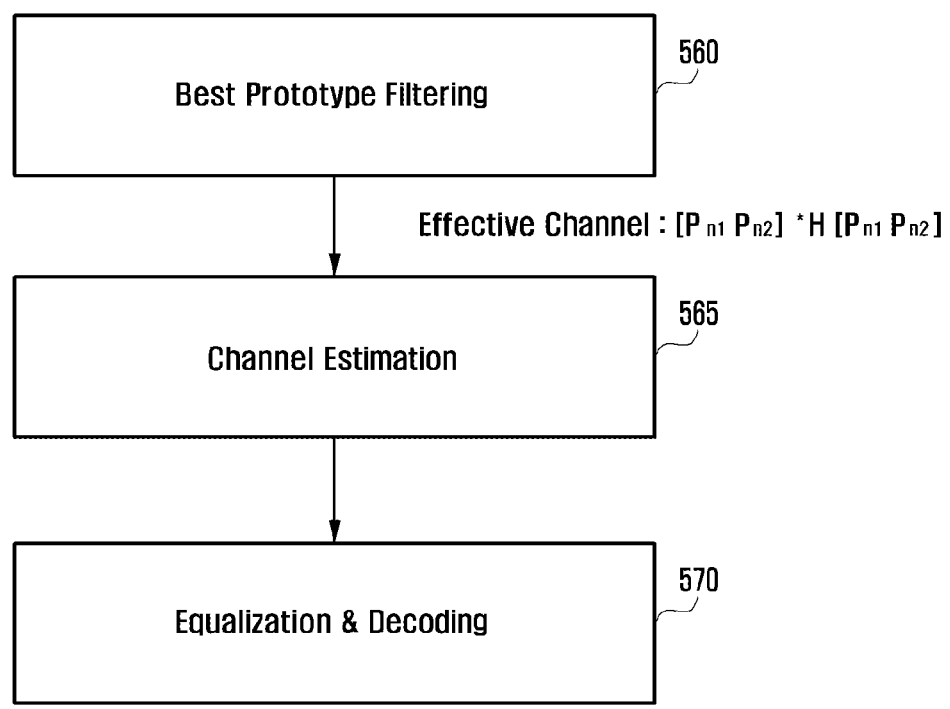

FIGS. 5A, 5B, and 5C are diagrams illustrating a method for determining a prototype filter for a downlink Multiple-Input Multiple-Output (MIMO) channel according to an embodiment of the present invention.

In reference to FIG. 5A, an eNB 502 and a UE 504 may communicate signals.

The dedicated prototype determination for a MIMO channel is identical with that for an SISO channel with the exception that the reception signals are shown in the form of a matrix in the channel estimation and filter determination process.

The eNB 502 may transmit a reference signal (pilot signal) for use by the UE 504 in channel estimation, using a common prototype filter, at step 505. In an embodiment, the common prototype filter may be preconfigured to the UE 504 and the eNB 502. In an embodiment, it may be possible to transmit multiple signals for channel estimation that can be expressed in the form of a matrix. In detail, it may be possible to transmit the prototype filter-applied reference signals through channels A and B.

At step 510, the eNB 502 may transmit weight information for use in selecting a prototype filter according to a channel estimation result. The weight information transmission is optional. The weight information may be determined based on at least one of channel condition and scheduling status determined by the eNB 502 such that the UE 504 can select as a priority at least one of inter-symbol interference and inter-carrier interference. In an embodiment, per-channel weights may be identical with or different from each other.

If the weight information is received, the UE 504 may estimate the channel for communicating signals with the eNB 502 using the common prototype filter. At this time, the UE 504 may basically determine a dedicated prototype filter that maximizes its Signal-to-Interference-plus-Noise Ratio (SINR). The UE 504 may also select the dedicated prototype filter based on the information received at step 510. In detail, the UE 504 may select the dedicated prototype filter using the prototype filter weight information that is transmitted by the eNB 502 for spectrum interference control in a multiuser access environment. In more detail, the eNB 502 may select a dedicated prototype filter maximizing its SINR within a range of the prototype filter set restricted or biased based on the weight information. The dedicated prototype filter maximizing SINR is selected as shown in FIG. 5B.

In reference to FIG. 5B, the UE 504 may at step 530 perform filtering on the signal transmitted at step 505 by the eNB 502 using the common prototype filter.

The UE 504 may perform channel estimation based on the filtered information at step 535.

At step 540, the UE 504 may select a filter set capable of maximizing its capacity from a table 550 which is restricted based on the information received at step 510 in a filter table 545 including the prototype filter set preconfigured or received from the eNB 502.

The UE 504 may transmit the information on the selected filter set to the eNB 502 at step 515. In detail, the UE 504 may transmit to the eNB 502 the information on the dedicated prototype filter as feedback information through an uplink control channel. At this time, the UE 504 may transmit an index indicating the dedicated prototype filter to the eNB 502 to minimize waste of control channel.

At step 520, the eNB 502 may determine the final dedicated prototype filter for use in transmitting a signal to the UE 504 based on the information received at step 515. In detail, the eNB 502 may determine the final dedicated prototype filter based on at least one of channel condition and scheduling status. The eNB 502 may transmit to the UE 504 the information on the dedicated prototype filter determined finally. The eNB 502 may transmit to the UE 504 an index indicating the dedicated prototype filter determined finally.

At step 525, the eNB 502 may transmit a signal to the UE 504 by means of the dedicated prototype filter selected finally at step 520. The signal may include a signal being transmitted on a data channel. The UE 504 may also receive a signal based on the information received at step 520 as shown in FIG. 5C.

At step 560, the UE 504 may perform filtering on the signal received at step 525 with the prototype filter determined based on the information received at step 520.

The UE 504 may perform channel estimation at step 565 based on the filtered information. In an embodiment, the channel estimation step may be selectively applied.

The UE 504 may acquire the information transmitted by the eNB 502 by performing at least one of equalization and decoding on the filtered information at step 570.

The eNB and the UE may communicate signals repeating the above-described steps and use the same filter at least one transmission after the dedicated prototype filter is determined finally. The overall operation of FIG. 5A may be performed for every signal transmission.

Figure 6B:
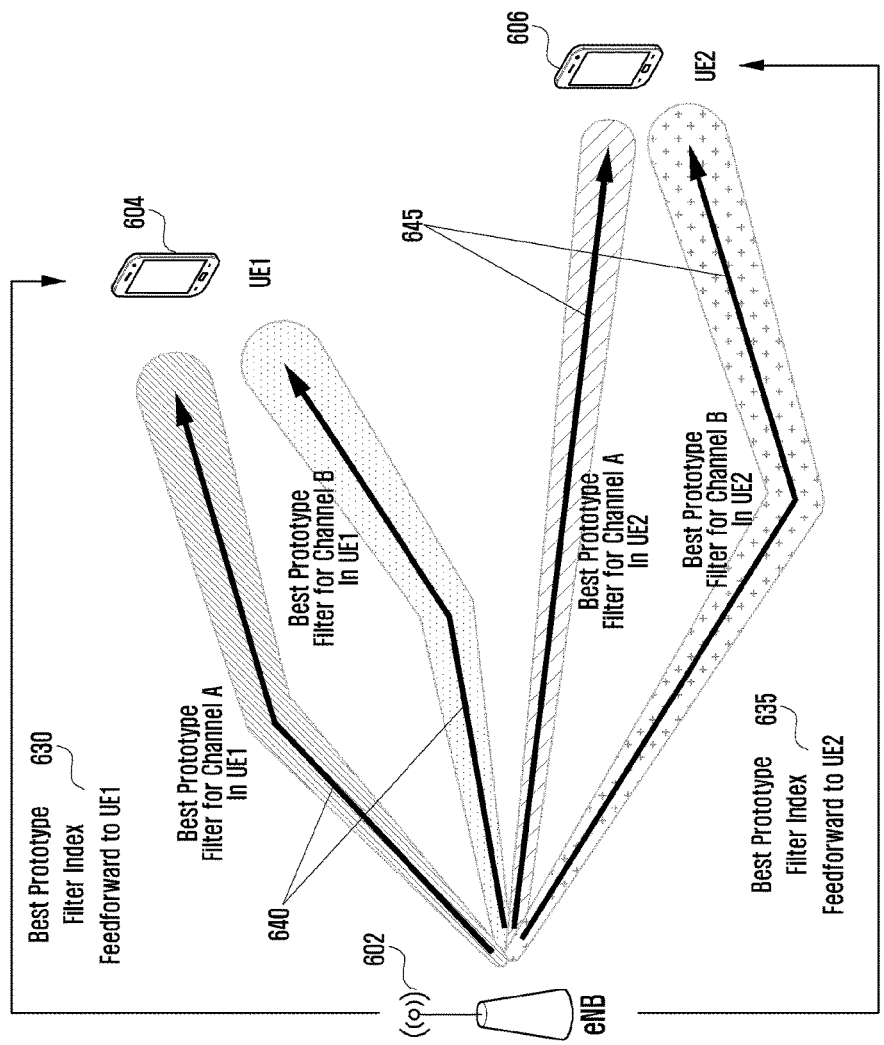

FIGS. 6A and 6B are diagrams illustrating a method for determining a downlink prototype filter at multiple UEs according to an embodiment of the present invention.

In reference to FIGS. 6A and 6B, an eNB 602 may communicate signals with a first UE (UE1) 604 and a second UE (UE2) 606. In detail, the eNB 602 may support SISO and MIMO simultaneously. Although the embodiment is directed to a MIMO-based signal transmission/reception method, the present invention may be applied to a SISO-based signal transmission/reception method in a similar manner.

The eNB 602 may transmit a reference signal to the UE1 604 using a common prototype filter as denoted by reference number 610.

The eNB 602 may transmit a reference signal to the UE2 606 using the common prototype filter as denoted by reference number 615.

The reference signals may be transmitted regardless of transmission order. In an embodiment, the common prototype filter information may be preconfigured to the eNB 602 and the UEs.

The UE1 604 may maximize transmission throughput based on the received signal as denoted by reference number 620. In detail, the UE1 604 may select a prototype filter capable of maximizing transmission throughput on the channel based on the received signal from the preconfigured prototype filter set. The UE1 604 may transmit to the eNB 602 the selected prototype filter information as feedback information. In more detail, the UE1 604 may transmit to the eNB 602 an index indicating the selected prototype filter. The UE may also transmit to the eNB 602 the information on the channel estimated based on the signal received as denoted by reference number 610.

The UE2 606 may select a prototype filter capable of maximizing transmission throughput based on the received signal as denoted by reference number 625. In detail, the UE2 606 may select a prototype filter capable of maximizing transmission throughput on the channel based on the received signal from the preconfigured prototype filter set. The UE2 606 may transmit to the eNB 602 the selected prototype filter information as feedback information. In more detail, the UE2 606 may transmit to the eNB 602 an index indicating the selected prototype filter. The UE may also transmit to the eNB 602 the information on the channel estimated based on the signal received as denoted by reference number 615.

The eNB 602 may select best prototype filters based on the information received from the UEs. In detail, the eNB 602 may determine the best prototype filters capable of maximizing the overall throughput of the channel based on at least one of the received information, scheduling status, and channel condition. In an embodiment, the best prototype filters of the UEs may be identical with or different from each other.

The eNB 602 may transmit to the UE1 604 the index of the selected best prototype filter as denoted by reference number 630.

The eNB 602 may transmit to the UE2 606 the index of the selected best prototype filter as denoted by reference number 635.

The eNB 602 may transmit a signal to the UE1 604 using the best filter as denoted by reference number 640.

The eNB 602 may transmit a signal to the UE2 606 using the best filter as denoted by reference number 645.

Through the above procedure, the eNB is capable of selecting the filters maximizing the transmission throughput on the channel and communicating signals with the UEs using the selected filters.

Meanwhile, uplink prototype filter selection may be performed as follows. The first approach is to use a filter identical with the prototype filter used in downlink under the assumption that there is reciprocity between uplink and downlink. This approach may be advantageous when the uplink and downlink frequencies of the UE are identical with each other or when the UE has a low mobility. The second approach is to estimate an uplink prototype filter independently of the downlink prototype filter under the assumption that the downlink and uplink channels are independent from each other.

In the first approach, it may be possible to select the prototype filter for use in downlink based on at least one of the above embodiments, and the UE may use the prototype filter selected for downlink in uplink transmission.

Figure 7A:
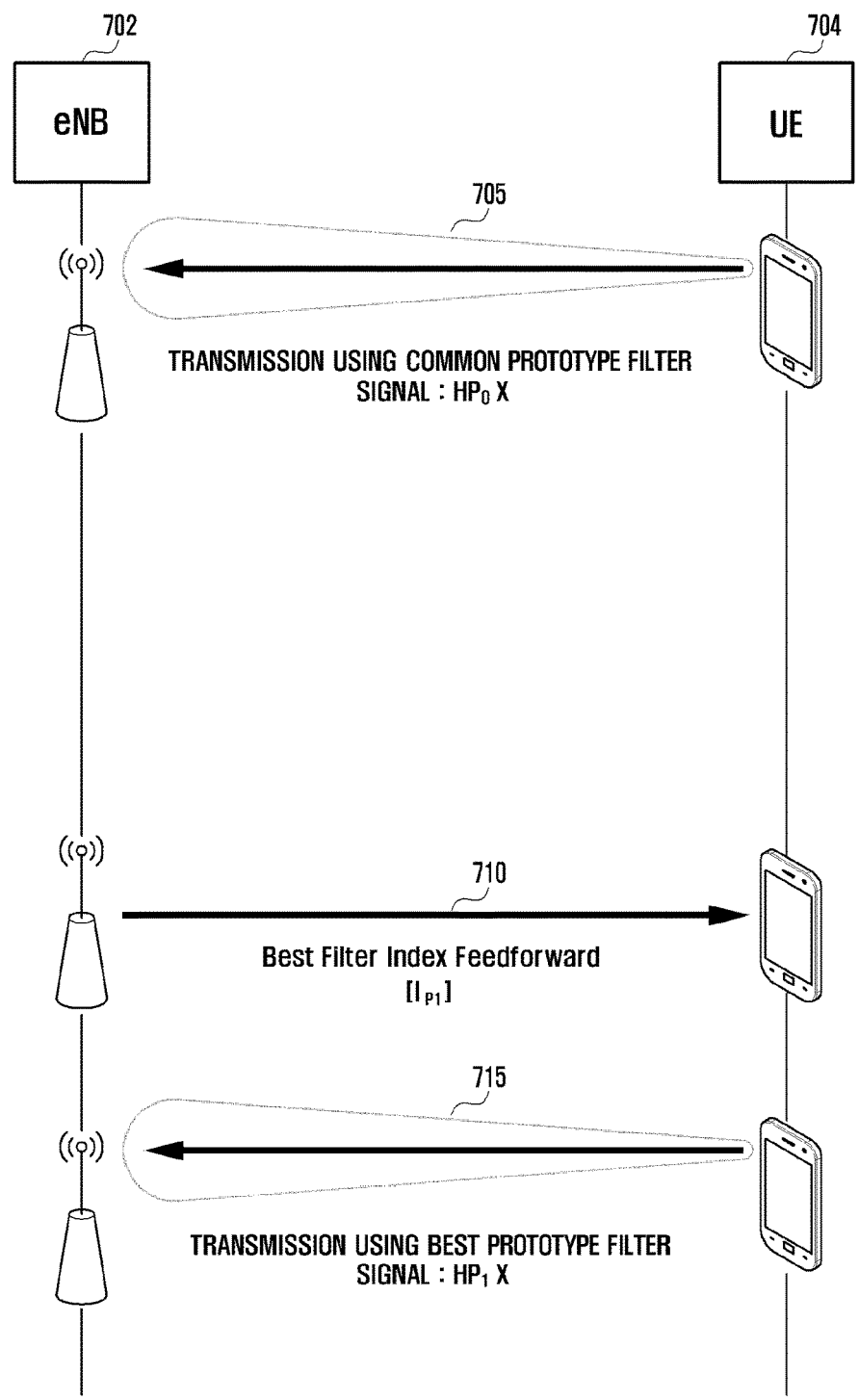
FIGS. 7A, 7B, and 7C are diagrams illustrating a method for selecting a prototype filter for use on an uplink Single-Input Single-Output (SISO) channel according to an embodiment of the present invention.
Figure 7B:
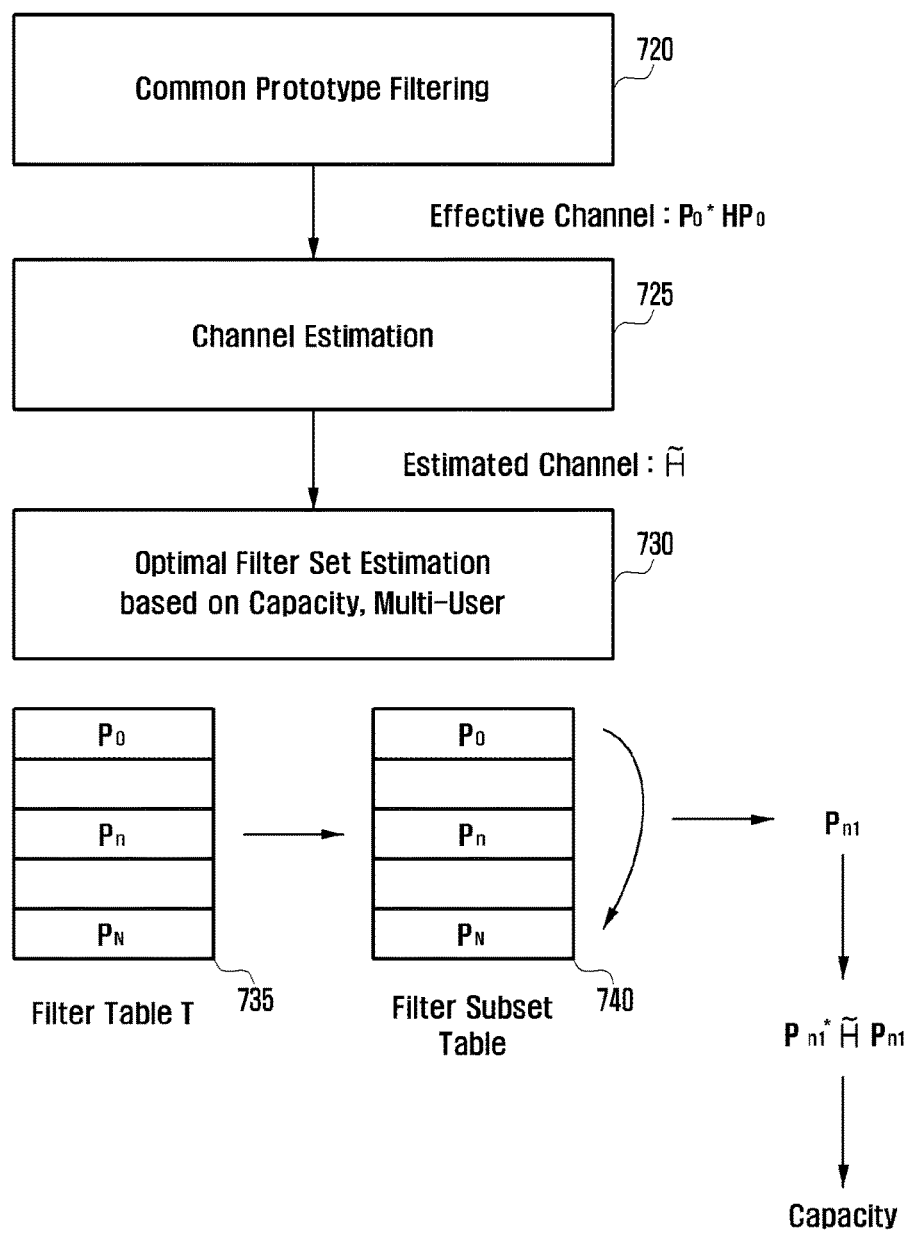
Figure 7C:
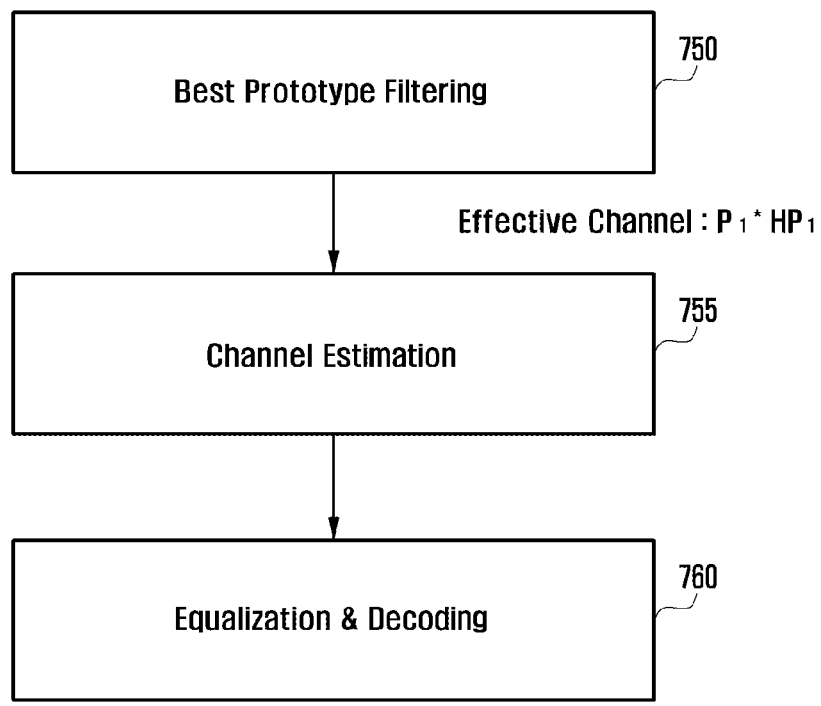

In the second approach, the prototype filter weight transmission step may be skipped because the eNB works as a receiver although the uplink procedure is similar to the downlink procedure. A description is made thereof hereinafter. FIGS. 7A, 7B, and 7C are diagrams illustrating a method for selecting a prototype filter for use on an uplink Single-Input Single-Output (SISO) channel according to an embodiment of the present invention.

In reference to FIG. 7A, an eNB 702 may communicate signals with a UE 704.

The UE 704 transmit a Reference Signal (pilot signal) for use by the eNB 702 in channel estimation using a common prototype filter at step 705. In an embodiment, the common prototype filter may be preconfigured by the UE 704 or the eNB 702. In an embodiment, the eNB 702 may perform channel estimation using the common prototype filter based on the signal transmitted by the UE 704. At this time, the eNB 702 determines a spectrum bandwidth minimizing inter-user spectrum interference in consideration of a multiuser access situation and selects a dedicated prototype filter maximizing SINR for the UE 704 among the prototype filters having the determined spectrum bandwidth. A description is made of the method for selecting the dedicated prototype filter maximizing SINR with reference to FIG. 7B.

In reference to FIG. 7B, the eNB 702 may perform filtering, at step 720, on the signal transmitted by the UE 704 at step 705 using the common prototype filter.

The eNB 702 may perform channel estimation based on the filtered information at step 725.

The eNB 702 may select at step 730 a filter set capable of maximizing its capacity from table 740, which is restricted to maximize the channel throughput in a filter table 735 including a preconfigured prototype filter set.

The eNB 702 may transmit the selected filter set information to the UE 704 at step 710. In detail, the eNB 702 may transmit to the UE 704 the information on the selected dedicated prototype filter as feedback information through a downlink control channel. At this time, the eNB 702 may transmit an index indicating the dedicated prototype filter to the UE 704 to minimize waste of control channel.

At step 715, the UE 704 may transmit a signal to the eNB 702 using the dedicated prototype filter selected finally based on the information received at step 710. The signal may include a signal transmitted over a data channel. The eNB 702 may receive a signal transmitted by the UE 704 in a way as shown in FIG. 7C.

At step 750, the eNB 702 may perform filtering with the prototype filter feedforwarded at step 710.

The eNB 702 may perform channel estimation based on the filtered information at step 755. In an embodiment, the channel estimation may be performed optionally.

The eNB 702 may perform at step 760 at least one of equalizing and decoding on the filtered information to acquire the information transmitted by the UE 704.

The eNB and the UE may communicate signals repeating the above-described steps and use the same filter in at least one transmission after the dedicated prototype filter is determined finally. The overall operation of FIG. 7A may be performed for every signal transmission.

Figure 8A:
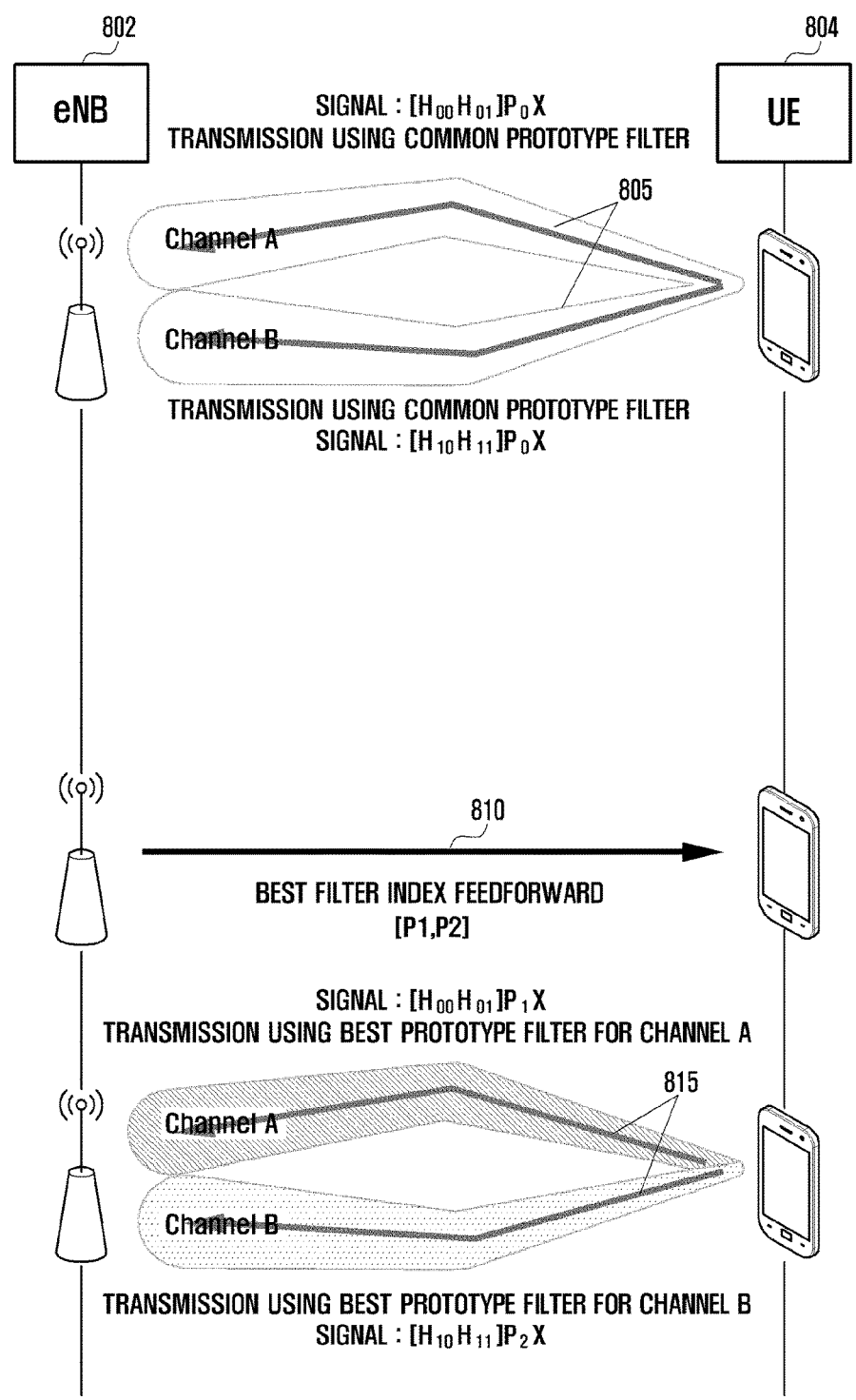
FIGS. 8A, 8B, and 8C are diagrams illustrating a method for selecting a prototype filter for an uplink Multiple-Input Multiple-Output (MIMO) channel according to an embodiment of the present invention.
Figure 8B:
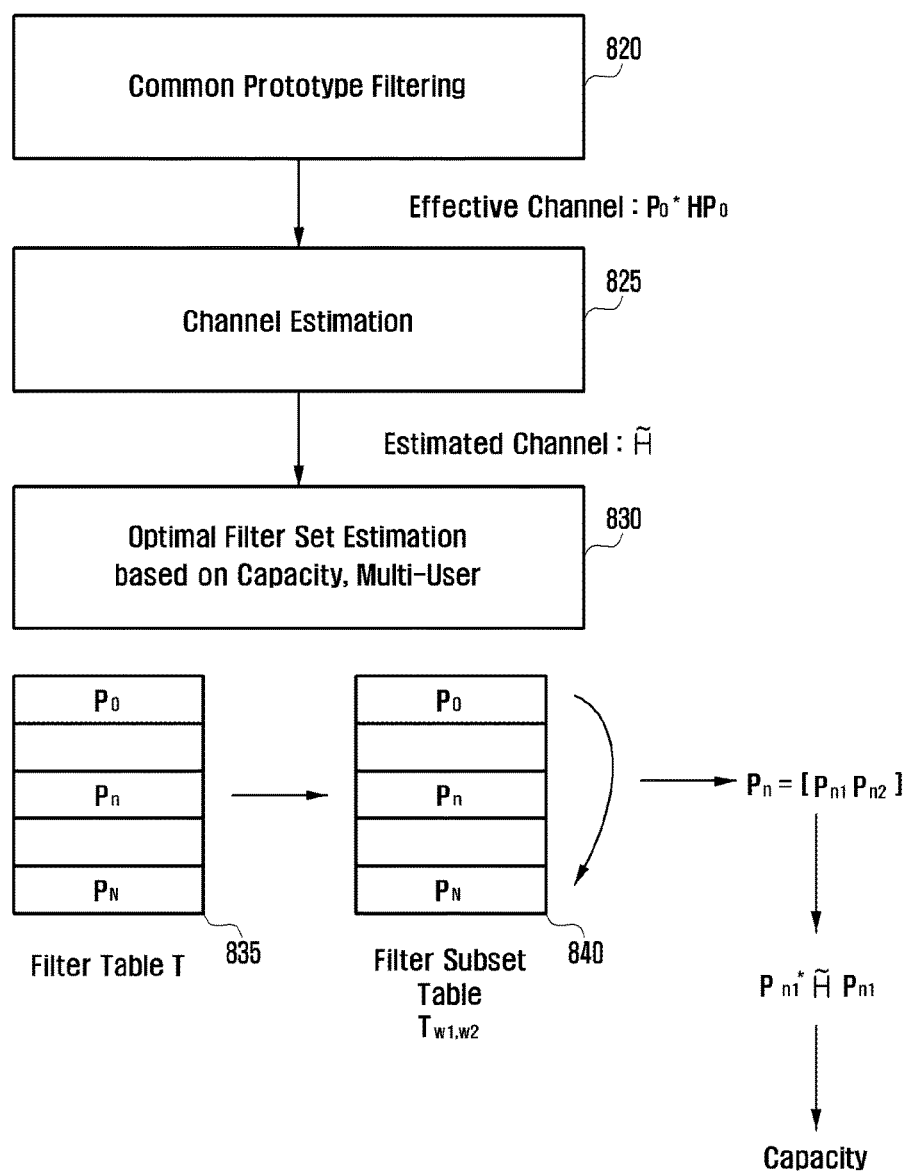
Figure 8C:
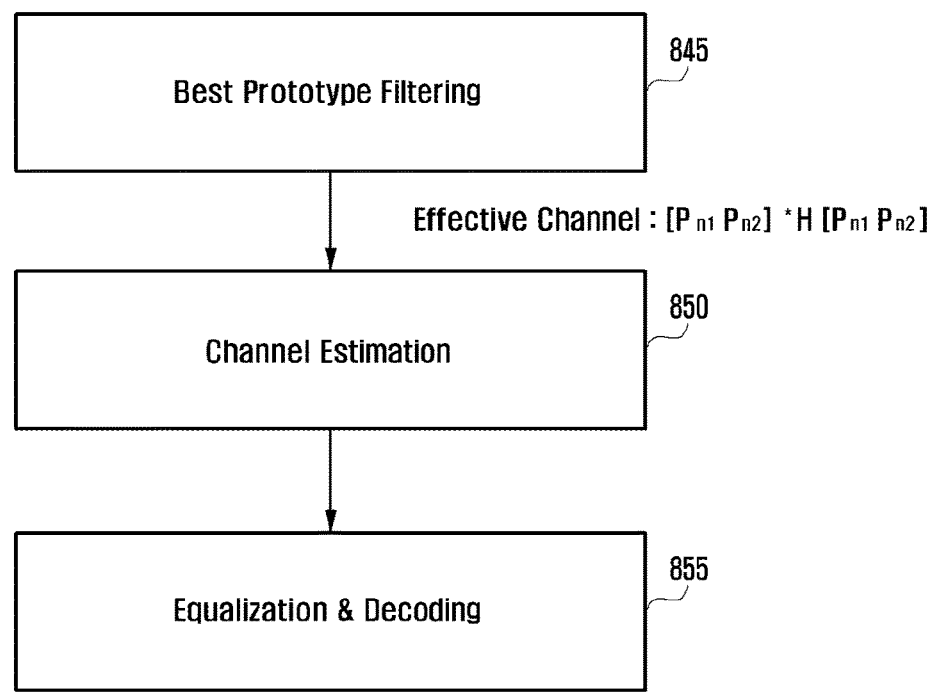

FIGS. 8A, 8B, and 8C are diagrams illustrating a method for selecting a prototype filter for an uplink Multiple-Input Multiple-Output (MIMO) channel according to an embodiment of the present invention.

The dedicated prototype determination for the MIMO channel is identical with that for the SISO channel with the exception that the reception signals are shown in the form of a matrix in the channel estimation and filter determination process.

In reference to FIG. 8A, the eNB 802 and the UE 804 may communicate signals.

The UE 804 may transmit a reference signal (pilot signal) for use by the eNB 802 in channel estimation, using a common prototype filter, at step 805. In an embodiment, the common prototype filter may be preconfigured to the UE 804 and the eNB 802. In an embodiment, it may be possible to transmit multiple signals for channel estimation that can be expressed in the form of a matrix. In detail, it may be possible to transmit the prototype filter-applied reference signals through channels A and B. In an embodiment, the eNB 802 performs channel estimation with the signal transmitted by the UE 804 using the common prototype filter. At this time, the eNB 802 may determine a spectrum bandwidth minimizing inter-user spectrum interference in consideration of a multiuser access environment and may select a dedicated prototype filter maximizing SINR for the UE 802 among the prototype filters having the determined spectrum bandwidth. The dedicated prototype filter maximizing SINR is selected as shown in FIG. 8B.

In reference to FIG. 8B, the eNB 802 may perform filtering, at step 820, on the signal transmitted at step 805 by the UE 804.

The eNB 802 may perform channel estimation based on the filtered information at step 825.

At step 830, the eNB 802 may select a filter set capable of maximizing its capacity from a table 840, which is restricted to maximize the channel throughput in a filter table 835 including preconfigure prototype filter sets.

The eNB 802 may transmit the information on the selected filter set to the UE 804 at step 810. In detail, the eNB 802 may transmit to the UE 804 the information on the dedicated prototype filter as feedback information through a downlink control channel. At this time, the eNB 802 may transmit an index indicating the dedicated prototype filter to the UE 804 to minimize waste of control channel.

At step 815, the UE 804 may transmit a signal to the eNB 802 using the dedicated prototype filter determined finally based on the information received at step 810. The signal may include a signal being transmitted through a data channel. The eNB 802 may also receive the signal transmitted by the UE 804 in a way as shown in FIG. 8C.

At step 845, the eNB 802 may perform filtering with the prototype filter feedforwarded at step 810.

The eNB 802 may perform channel estimation based on the filtered information at step 850 In an embodiment, the channel estimation may be performed optionally.

At step 855, the eNB 802 may perform at least one of equalization and decoding on the filtered information to acquire the information transmitted by the UE 804.

The eNB and the UE may communicate signals repeating the above-described steps and use the same filter in at least one transmission after the dedicated prototype filter is determined finally. The overall operation of FIG. 8A may be performed for every signal transmission.

Figure 9:
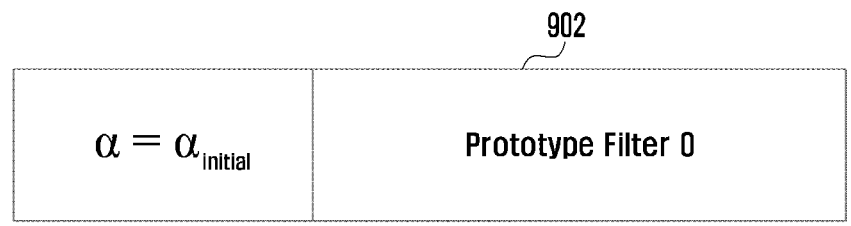
FIG. 9 is a diagram illustrating a prototype filter set with weights according to an embodiment of the present invention.
Figure 9:
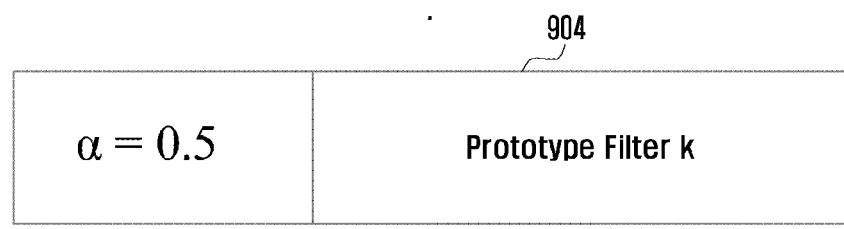
Figure 9:
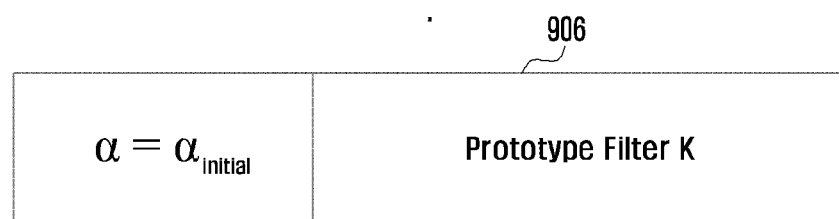

FIG. 9 is a diagram illustrating a prototype filter set with weights according to an embodiment of the present invention.

Unlike OFDM, the components of Self-Interference present in the form of Inter-Symbol Interference (ISI) and Spectrum Confinement present in the form of Inter-Carrier Interference (ICI) are determined according to the shape of the orthogonality-reduced prototype filter.

The prototype filter is characterized by a tradeoff between the self-interference and spectrum bandwidth such that the spectrum bandwidth increases (decreases) as the self-interference decreases (increases). This relationship is shown in an optimization formula generating the prototype filter and, in the case of using a single prototype filter, it can be expressed as follows.

$$\text{minimize } \alpha SI(P_T) + (1-\alpha) SB(P_T)$$

Here, SI denotes self-interference, and SB denotes spectrum bandwidth. In the case of using a plurality of prototype filters, the self-interference and spectrum bandwidth have a relationship as follows.

$$\min_{P_{T,0,0}, P_{T,1,0}} \alpha(SI(P_{T,0,0}) + SI(P_{T,1,0})) + (1-\alpha)(SB(P_{T,0,0}, Q) + SB(P_{T,1,0}, Q))$$

Here, the self-interference decreases and the spectrum bandwidth increases as α increases. In contrast, the self-interference increases and the spectrum bandwidth decreases as α decreases From this nature of the prototype filter, it may be possible to use the self-interference component as an index for controlling signal quality of the receiving node and the spectrum bandwidth component as an index for controlling ICI occurring when multiple receiving nodes are connected. Accordingly, it may be possible to configure a prototype filter set according to α and to control the reception SINR at the UE or the interference caused in a multiuser environment by adjusting the range of α of the filters belonging to the set. As a result, the eNB may perform interference control for a multiuser environment using the range of α of the prototype filter, and the UE may determine the best prototype filter in a given range of α. In an embodiment, $\alpha_{initial}$ and $\alpha_{final}$ may be set to 0 and 1, respectively, or other values.

In detail, the prototype filter index corresponding to $\alpha_{initial}$ is 0 as denoted by reference number 902, the prototype filter index corresponding to α set to 0.5 is k as denoted by reference number 904, and the prototype filter index corresponding to $\alpha_{final}$ is K as denoted by reference number 906. The filter index mapped to α may be changed depending on an embodiment, and the weight information may correspond to the value of α in an embodiment.

Figure 10:
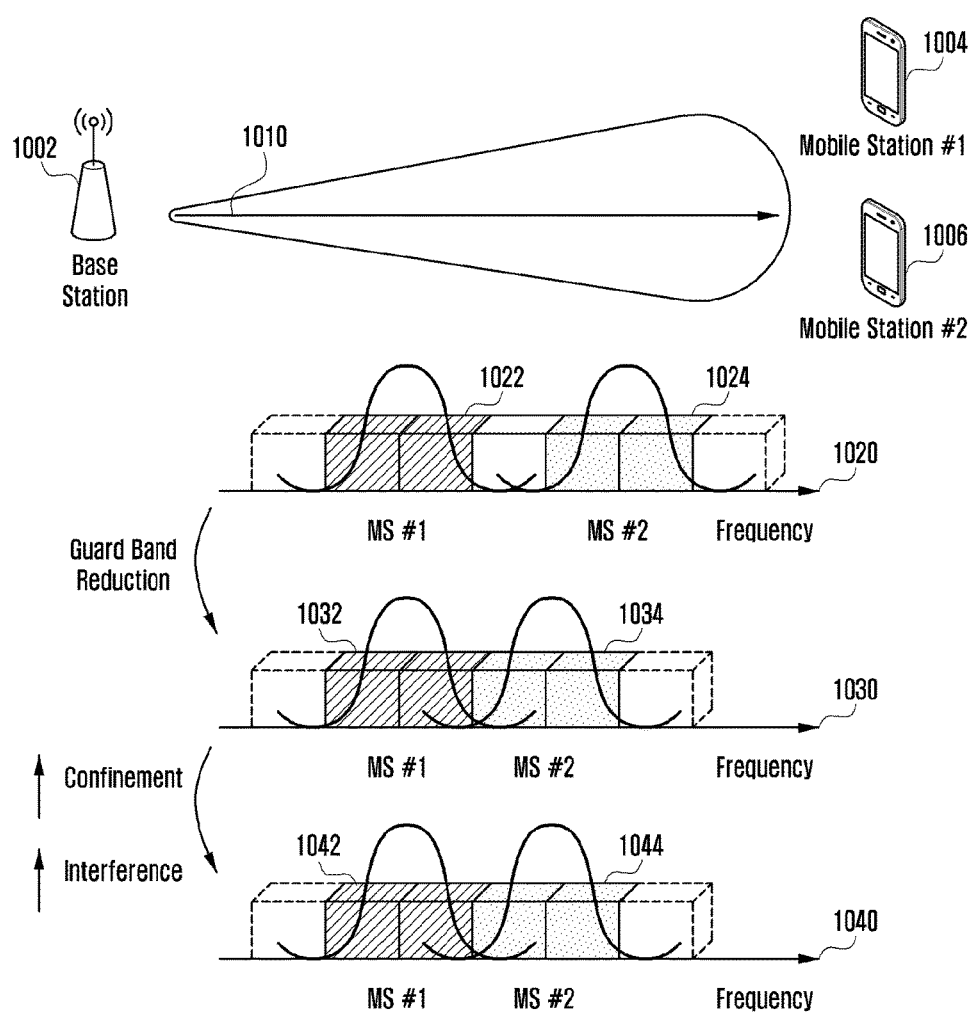
FIG. 10 is a diagram illustrating a situation-adaptive downlink prototype filter selection method according to an embodiment of the present invention.

FIG. 10 is a diagram illustrating a situation-adaptive downlink prototype filter selection method according to an embodiment of the present invention.

In reference to FIG. 10, the eNB 1002 may communicate signals with a first UE 1004 and a second UE 1006, and a dedicated prototype filter is selected from a prototype filter set for downlink transmission. The eNB 1002 may transmit signals to the UEs 1004 and 1006 using a prototype filter as denoted by reference number 1010.

The eNB may determine as far as possible filters minimizing guard bands in the resources for signal transmission to multiple UEs to improve frequency utilization efficiency as denoted by reference numbers 1020, 1022, and 1024. At this time, interference may occur between adjacent subcarriers because of UE mobility, frequency offset, and hardware mismatch. In order to control such interference, the eNB 1002 may check whether the interference increases based on the Channel Quality Indicator (CQI) transmitted by respective UEs. If the CQI decreases because of the extra resource allocation to the UEs on the same channel condition, the eNB may assume a presence of inter-subcarrier interference as denoted by reference numbers 1030, 1032, and 1034.

In this case, the eNB 1002 may designate to the prototype filter weight to be transmitted to the UE a range for increasing self-interference instead of reducing the spectrum bandwidth of the prototype filter based on the resource allocated to the UE.

The UE selects a channel and the best filter for the self-interference from the restricted prototype filter table based on the weight information as denoted by reference numbers 1040, 1042, and 1046. Otherwise, if the number of UEs to which the eNB allocates resources is small and thus the frequency interval between the resources allocated to the UEs is broad enough, the eNB notifies the UEs of the weight range that does not restrict the spectrum bandwidth so as to maximize the signal-to-interference ratios of the UEs.

Figure 11:
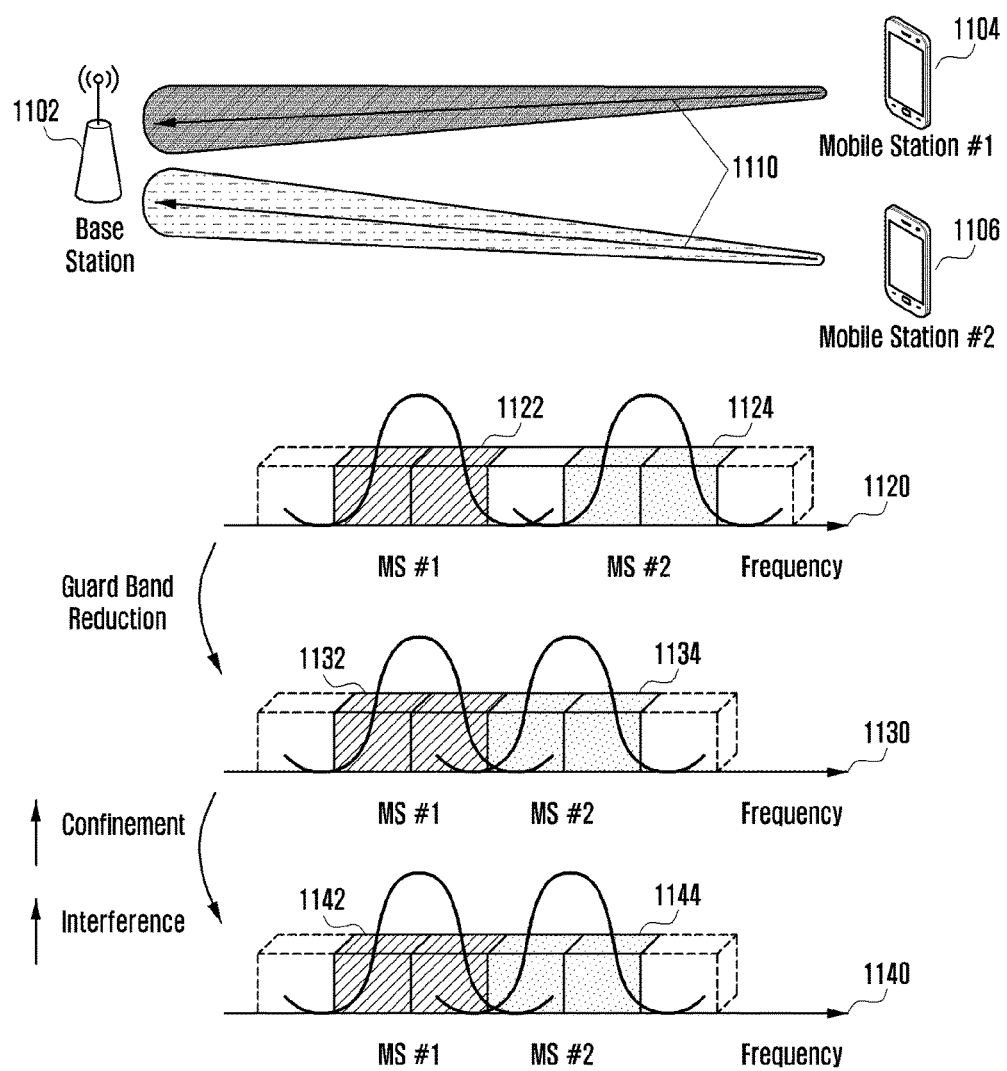
FIG. 11 is a diagram illustrating a situation-adaptive uplink prototype filter selection method according to an embodiment of the present invention.
Figure 12:
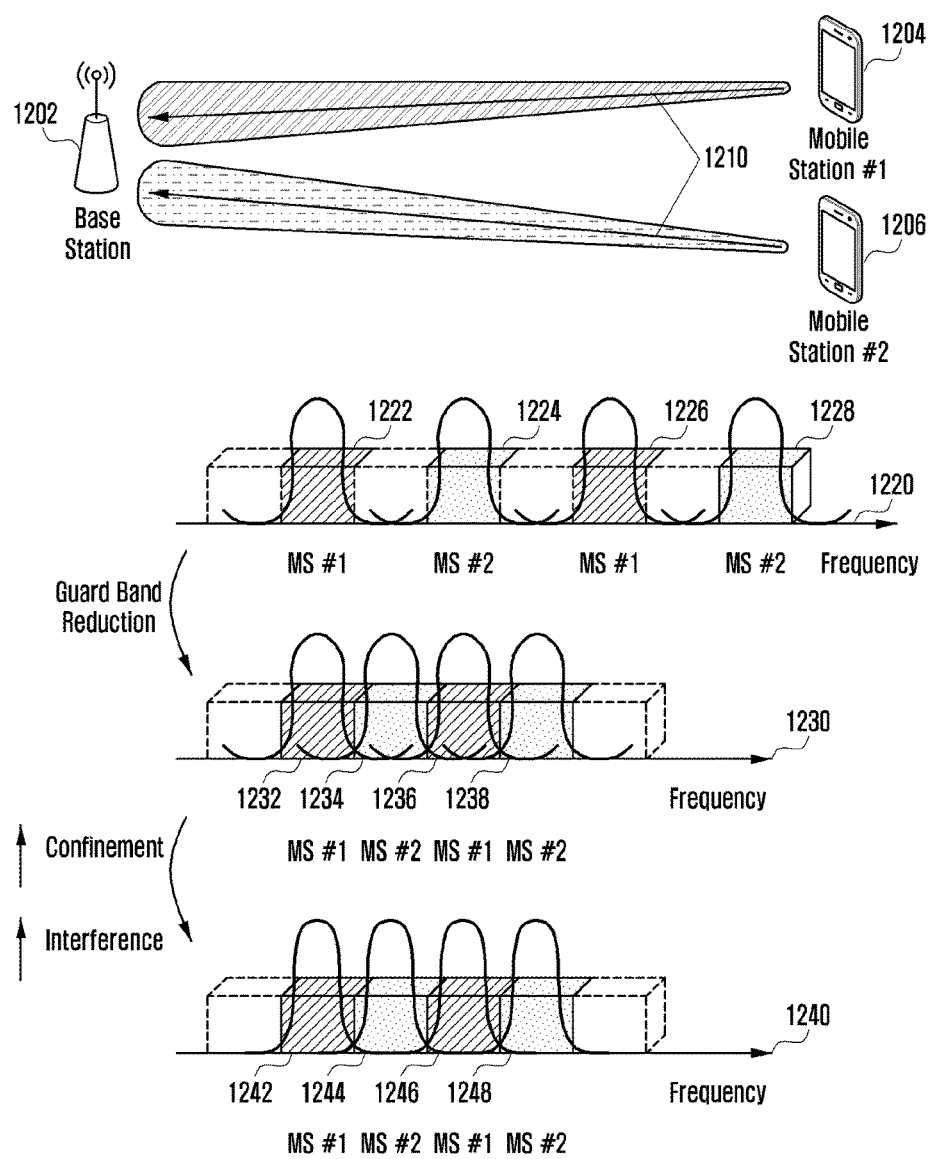
FIG. 12 is a situation-adaptive uplink prototype filter selection method according to another embodiment of the present invention.

FIG. 11 is a diagram illustrating a situation-adaptive uplink prototype filter selection method according to an embodiment of the present invention, and FIG. 12 is a situation-adaptive uplink prototype filter selection method according to another embodiment of the present invention.

In detail, FIG. 11 shows a prototype filter index selection method for use when uplink subcarriers to be allocated to each UE are localized, and FIG. 12 shows a prototype filter index selection method for use when the uplink subcarriers to be allocated to each UE are distributed.

In reference to FIGS. 11 and 12, the eNB 1102 (1202) may communicate with a first UE 1104 (1204) and a second UE 1106 (1206) and select a dedicated prototype filter for downlink transmission from a prototype filter set.

The eNB 1102 (1202) may transmit signals to the UEs 1104 and 1106 (1204 and 1206) using a prototype filter as denoted by reference number 1110 (1210).

In the case that multiple UEs 1104 and 1106 (1204 and 1206) transmit uplink signals to the eNB 1102 (1202), the eNB 1102 (1202) may allocate resources to the UEs 1104 and 1106 (1204 and 1206) in a way of minimizing interference therebetween and maximizing frequency utilization efficiency as denoted by reference numbers 1120 to 1124 (1220 to 1228). Similar to the downlink case, the eNB 1102 (1202) may allocate resource to the UEs 1104 and 1106 (1204 and 1206) in a way of minimizing the guard band for frequency utilization efficiency. In this case, interference may occur between adjacent subcarriers because of UE mobility, frequency offset, and hardware mismatch, as in the downlink case. In order to control such interference, the eNB 1102 (1202) may check whether the interference increases based on the SINR of the signals transmitted by the UEs.

If the CQI decreases because of the extra resource allocation to the UEs on the same channel condition, the eNB 1102 (1202) may assume a presence of inter-subcarrier interference as denoted by reference numbers 1130 to 1134 (1230 to 1238). In this case, the eNB 1102 (1202) transmits a prototype filter index indicating reduction of spectrum bandwidth and increase of self-interference to minimize inter-subcarrier interference. Otherwise, if the number of UEs to which the eNB 1102 (1202) allocates resources is small and thus the frequency interval between the resources allocated to the UEs 1104 and 1106 (1204 and 1206) is broad enough, the eNB 1102 (1202) transmits to the UEs 1104 and 1106 (1204 and 1206) a Prototype Filter index indicating no restriction of the spectrum bandwidth so as to maximize the signal-to-interference ratios of the UEs as denoted by reference numbers 1120 to 1124 (1220 to 1228).

Figure 13:
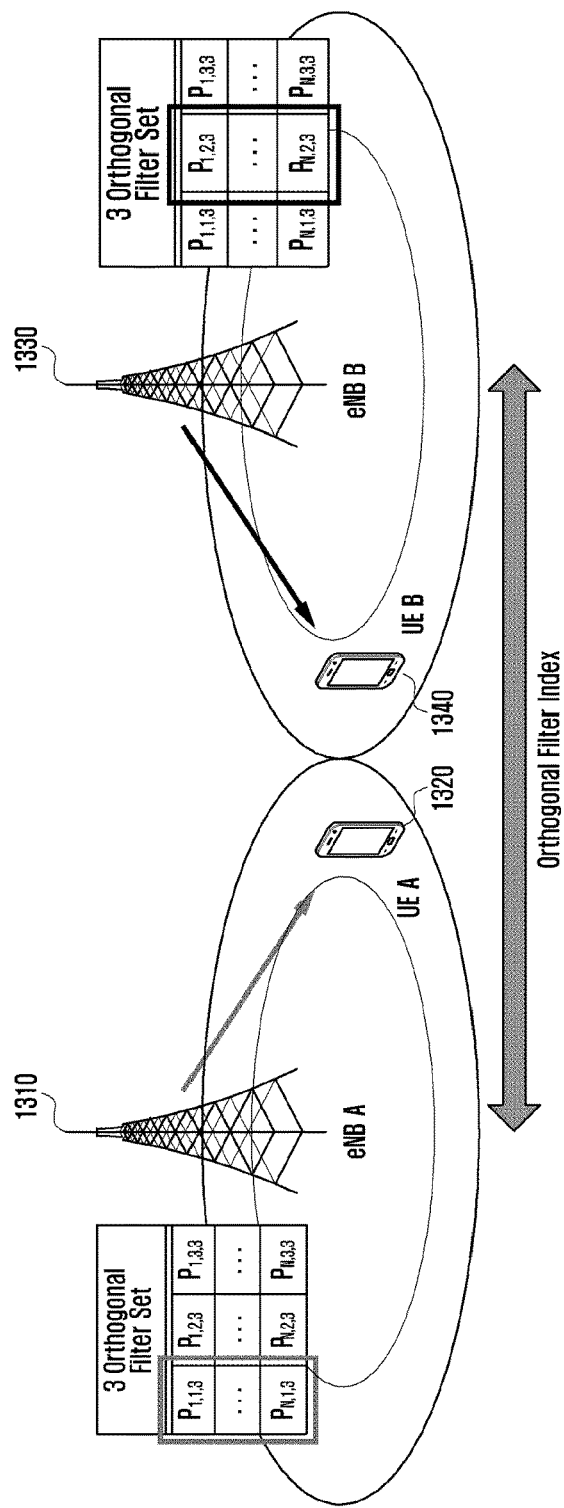
FIG. 13 is a diagram illustrating a signal transmission/reception method by applying a filter through information exchange between eNBs according to an embodiment of the present invention.

FIG. 13 is a diagram illustrating a signal transmission/reception method by applying a filter through information exchange between eNBs according to an embodiment of the present invention.

In reference to FIG. 13, and eNB A 1310 and an eNB B 1330 may communicate with at least one of a UE A 1320 and a UE B 1340.

Each UE may report measurement information to the eNBs. In detail, each UE may report the information on at least one of the signals received from its serving eNB and neighboring eNBs to the serving eNB. The reported information may include signal strengths from the eNBs, and the signal strength can be used to determine the distance from the eNB that has transmitted the signal. If the measurement report is received, the eNB may determine whether the UE is located at a cell edge based on the measurement report and, if so, further check the information on the neighboring eNBs based on the measurement report. In more detail, the UE may determine whether the UE is located at the cell edge based on CQI.

At this time, the eNB may transmit a signal by applying to the cell edge filter a prototype filter that is orthogonal with prototype filters in use by cell edge UEs of the neighboring eNBs to minimize inter-eNB interference.

The eNB A 1310 and the eNB B 1320 may exchange the information on the orthogonal filters. The eNBs may also exchange information on the cell edge UEs and allocate orthogonal prototype filters to the cell edge UEs based on the exchanged information to minimize interference from the neighboring eNBs to the cell edge UEs. In more detail, the UE A 1320 is located at the cell edge of the eNB A 1310, and the UE B 1340 is located at the cell edge of the eNB B 1330. The eNBs may determine the cell edge UEs based on the measurement reports from the UEs and exchange information acquired based on the determination results to allocate orthogonal filter sets. In more detail, the information being exchanged between eNBs may include at least one of cell edge UE information and allocated filter information.

According to an embodiment, a UE configured with filter sets orthogonal between neighboring eNBs and located at a cell edge may transmit/receive signals with a filter selected in a predetermined filter set without extra information exchange. In an embodiment, each filter set may be configured per neighboring eNB so as to be orthogonal with the filter sets for the cell edges of other eNBs, and the UE located at a cell edge of a certain eNB may transmit/receive signals with a filter in the corresponding filter set without extra information exchange.

Also, it may be possible to apply to the cell edge UE a prototype filter having the orthogonality acquired by allocating based on the cell edge information exchanged among a plurality of eNBs. Accordingly, the cell edge information may be included as one of the factors for determining a prototype filter between an eNB and a UE in addition to inter-symbol interference, inter-subcarrier interference, and channel information.

Figure 14:
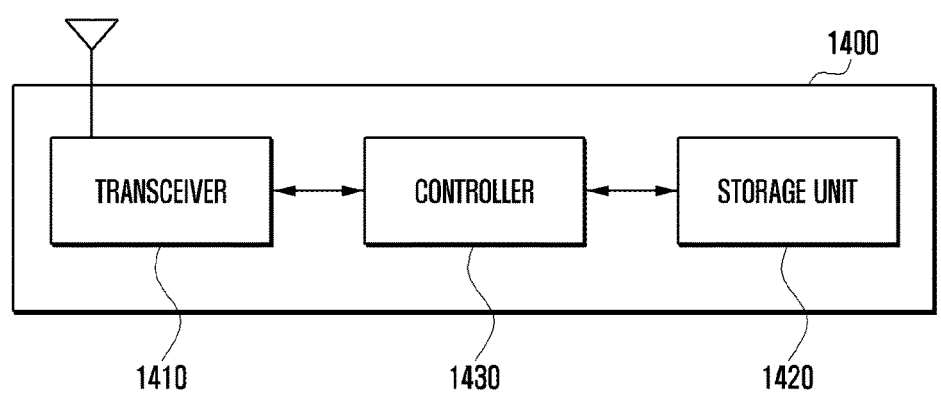
FIG. 14 is a block diagram illustrating a configuration of a UE according to an embodiment of the present invention.

FIG. 14 is a block diagram illustrating a configuration of a UE according to an embodiment of the present invention.

In reference to FIG. 14, the UE according to an embodiment may include a transceiver 1410, a storage unit 1420, and a controller 1430.

The transceiver 1410 may transmit/receive signals to/from an eNB.

The storage unit 1420 may store at least one of the information required for operations of the UE and the information being exchanged with the eNB. In detail, the storage unit 1420 may store the information on at least one of a common prototype filter and a prototype filter set.

The controller 1430 may control overall operations of the UE according to an embodiment. In detail, the controller 1430 may perform channel estimation based on the signal transmitted by the eNB. The controller 1430 may determine a suitable prototype filter based on the weight information transmitted by the eNB and transmit the information on the determined prototype filter to the eNB. The controller 1430 may also control to receive a signal from the eNB based on the dedicated prototype filter information feedforwarded by the eNB. The controller 1430 may control to transmit a reference signal to the eNB using a common prototype filter and uplink signals based on the dedicated prototype filter information from the eNB.

Figure 15:
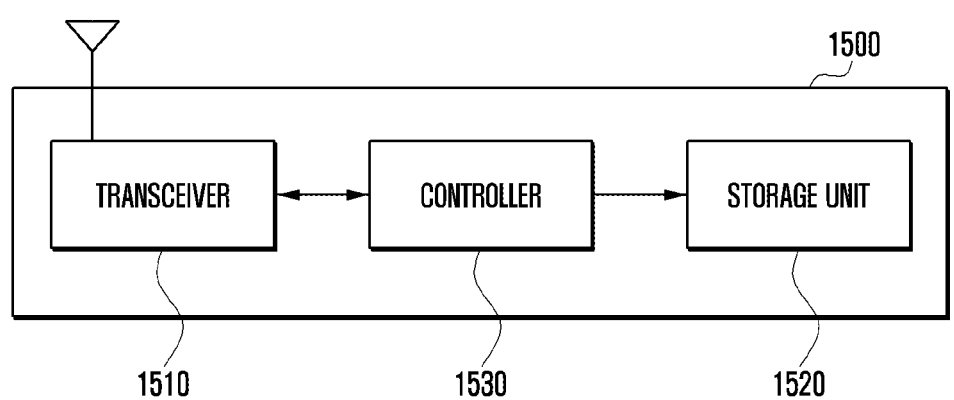
FIG. 15 is a block diagram illustrating a configuration of an eNB according to an embodiment of the present invention.

FIG. 15 is a block diagram illustrating a configuration of an eNB according to an embodiment of the present invention.

In reference to FIG. 15, the eNB according to an embodiment may include a transceiver 1510, a storage unit 1520, and a controller 1530.

The transceiver 1510 may transmit/receive signals to/from UEs.

The storage unit 1520 may store at least one of the information required for operations of the eNB and the information being exchanged with the UEs. In detail, the storage unit may store the information on at least one of a common prototype filter and a prototype filter set.

The controller 1530 may control overall operations of the eNB according to an embodiment. In detail, the controller 1530 may perform channel estimation based on the signal transmitted by a UE. The controller 1530 may also control to transmit dedicated prototype filter information to the UE. In an embodiment, the dedicated prototype filter may be transmitted based on at least one of inter-symbol interference, inter-carrier interference, and channel information. The controller 1530 may also transmit weight information for use by the UE in determining a dedicated prototype filter. The controller 1530 may also receive a signal transmitted by the UE based on the dedicated prototype filter information from the UE. The controller 1530 may also control to transmit a reference signal to the UE using a common prototype filter and select a suitable dedicated prototype filter based on the channel information reported by the UE and the filter information. In the case of using a single filter in a filter bank-based multicarrier transmission, channel switching may cause performance degradation. It may not be easy to prepare for a multiuser access situation just by adjusting self-interference and spectrum bandwidth derived by applying a filter bank. The method and system structure for applying a prototype according to an embodiment of the present invention is capable of minimizing spectrum interference and maximizing signal-to-interference-plus-noise ratio (SINR) in the multiuser access environment. It may also be possible to minimize overload caused by prototype filter exchange between the eNB and the UE using a prototype filter index.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for transmitting and receiving a signal of a terminal in a mobile communication system, the method comprising:
  receiving, from a base station, a reference signal generated by applying a first filter of a filter bank to a first input stream;
  determining channel information based on the reference signal and information on the first filter;
  transmitting, to the base station, the channel information;
  receiving, from the base station, information on a second filter of the filter bank for a signal dedicated to the terminal, the information on the second filter determined based on the channel information; and
  receiving, from the base station, a data signal generated by applying the second filter to a second input stream.

2. The method of claim 1, further comprising:
  receiving, from the base station, weight information for the first filter, wherein transmitting the channel information to the base station comprises transmitting information determined based on the weight information and the channel information to the base station, and
  wherein the information on the second filter is determined based on at least one of inter-symbol interference of the data signal, inter-subcarrier interference, or neighboring cell information reported by the terminal.

3. The method of claim 1, further comprising:
receiving, from the base station, filter set information, wherein the channel information comprises an index of a filter selected from the filter set.

4. The method of claim 1, wherein the channel information corresponds to a filter that maximizes channel throughput based on the reference signal.

5. A method for transmitting and receiving a signal of a base station in a mobile communication system, the method comprising:
transmitting, to a terminal, a reference signal generated by applying a first filter of a filter bank to a first input stream;
receiving, from the terminal, channel information determined based on the reference signal and information on the first filter;
transmitting, to the terminal, information on a second filter of the filter bank for a signal dedicated to the terminal, the information on the second filter determined based on the channel information; and
transmitting, to the terminal, a data signal to the terminal generated by applying the second filter to a second input stream.

6. The method of claim 5, further comprising:
transmitting, to the terminal, weight information for the first filter,
wherein receiving the channel information from the terminal comprises receiving information determined based on the weight information and the channel information from the terminal, and
wherein the information on the second filter is determined based on at least one of inter-symbol interference of the data signal, inter-subcarrier interference, and neighboring cell information reported by the terminal.

7. The method of claim 5, wherein the channel information includes information on a filter set which the base station transmits to the terminal and information on a filter selected from the filter set based on the reference signal, and
wherein the channel information corresponds to a filter that maximizes channel throughput based on the reference signal.

8. A terminal for transmitting and receiving a signal in a mobile communication system, the terminal comprising:
a transceiver configured to transmit and receive at least one signal; and
a controller coupled with the transceiver and configured to:
receive, from a base station, a reference signal generated by applying a first filter of a filter bank to a first input stream,
determine channel information based on the reference signal and information on the first filter,
transmit, to the base station, the channel information,
receive, from the base station, information on a second filter of the filter bank for a signal dedicated to the terminal, the information on the second filter determined based on the channel information, and
receive, from the base station, a data signal generated by applying the second filter to a second input stream.

9. The terminal of claim 8, wherein the controller is further configured to:
receive, from the base station, weight information for the first filter, and transmit information determined based on the weight information and the channel information to the base station, and
wherein the information on the second filter is determined based on at least one of inter-symbol interference of the data signal, inter-subcarrier interference, or neighboring cell information reported by the terminal.

10. The terminal of claim 8, wherein the controller is further configured to:
receive, from the base station, filter set information, wherein the channel information comprises an index of a filter selected from the filter set.

11. The terminal of claim 8, wherein the channel information corresponds to a filter that maximizes channel throughput based on the reference signal.

12. A base station for transmitting and receiving a signal in a mobile communication system, the base station comprising:
a transceiver configured to transmit and receive at least one signal; and
a controller coupled with the transceiver and configured to:
transmit, to a terminal, a reference signal generated by applying a first filter of a filter bank to a first input stream,
receive, from the terminal, channel information determined based on the reference signal and information on the first filter,
transmit, to the terminal, information on a second filter of the filter bank for a signal dedicated to the terminal, the information on the second filter determined based on the channel information, and
transmit, to the terminal, a data signal generated by applying the second filter to a second input stream.

13. The base station of claim 12, wherein the controller is further configured to:
transmit, to the terminal, weight information for the first filter, and
receive information determined based on the weight information and the channel information from the terminal,
wherein the information on the second filter is determined based on at least one of inter-symbol interference of the data signal, inter-subcarrier interference, or neighboring cell information reported by the terminal.

14. The base station of claim 12, wherein the controller is further configured to:
transmit, to the terminal, filter set information, and
receive, from the terminal, an index of a filter selected in the filter set.

15. The base station of claim 12, wherein the channel information corresponds to a filter that maximizes channel throughput based on the reference signal.

16. The method of claim 1, wherein the information on the second filter is determined based on interference between a subcarrier for the second filter and a neighbor subcarrier of the subcarrier.

17. The method of claim 5, wherein the information on the second filter is determined based on interference between a subcarrier for the second filter and a neighbor subcarrier of the subcarrier.

18. The terminal of claim 8, wherein the information on the second filter is determined based on interference between a subcarrier for the second filter and a neighbor subcarrier of the subcarrier.

19. The base station of claim 12, wherein the information on the second filter is determined based on interference between a subcarrier for the second filter and a neighbor subcarrier of the subcarrier.

* * * * *